(12) United States Patent
Ishikawa et al.

(10) Patent No.: US 10,191,685 B2
(45) Date of Patent: Jan. 29, 2019

(54) STORAGE SYSTEM, STORAGE DEVICE, AND DATA TRANSFER METHOD

(71) Applicant: HITACHI, LTD., Tokyo (JP)

(72) Inventors: Yohey Ishikawa, Tokyo (JP); Hideo Saito, Tokyo (JP); Tomohiro Kawaguchi, Tokyo (JP); Ken Tokoro, Tokyo (JP); Keishi Tamura, Tokyo (JP); Abhishek Johri, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 88 days.

(21) Appl. No.: 15/121,782

(22) PCT Filed: Jun. 11, 2014

(86) PCT No.: PCT/JP2014/065425
§ 371 (c)(1),
(2) Date: Aug. 26, 2016

(87) PCT Pub. No.: WO2015/189925
PCT Pub. Date: Dec. 17, 2015

(65) Prior Publication Data
US 2017/0017433 A1 Jan. 19, 2017

(51) Int. Cl.
*G06F 3/06* (2006.01)
*G06F 12/08* (2016.01)
*G06F 12/00* (2006.01)

(52) U.S. Cl.
CPC ............ *G06F 3/0647* (2013.01); *G06F 3/06* (2013.01); *G06F 3/0619* (2013.01);
(Continued)

(58) Field of Classification Search
CPC .......... G06F 12/02; G06F 3/0619; G06F 3/06; G06F 3/0644; G06F 3/0673;
(Continued)

(56) References Cited

U.S. PATENT DOCUMENTS 8,086,895 B2 * 12/2011 Maki ................... G06F 11/2028
711/162
2007/0038748 A1 2/2007 Masuyama
(Continued)

FOREIGN PATENT DOCUMENTS

JP 2007-042008 A 2/2007
JP 2008-134986 A 6/2008
(Continued)

OTHER PUBLICATIONS

International Search Report of PCT/JP2014/065425 dated Sep. 9, 2014.

*Primary Examiner* — Pierre Miche Bataille
(74) *Attorney, Agent, or Firm* — Mattingly & Malur, PC

(57) ABSTRACT

A storage system capable of realizing off-load data copy among storage subsystems constituting an HA pair configuration is provided. Therefore, in an HA pair configuration where a first volume of a first storage subsystem and a second volume of a second storage subsystem respectively respond a same virtual ID to the host, when the first or the second storage subsystem receives an instruction of off-load data copy specifying a virtual ID as the copy destination from the host computer, either a first volume or a second volume is selected as a copy source volume according to a position of a copy destination volume, and data is copied from the selected copy source volume to the copy destination volume.

14 Claims, 20 Drawing Sheets

(52) U.S. Cl.
CPC .......... *G06F 3/0644* (2013.01); *G06F 3/0673* (2013.01); *G06F 12/00* (2013.01)

(58) Field of Classification Search
CPC ............. G06F 11/1458; G06F 11/2076; G06F 2003/0692; G06F 11/2064
USPC .......................................... 711/170, 162, 165
See application file for complete search history.

(56) References Cited

U.S. PATENT DOCUMENTS

| | | |
|---|---|---|
| 2008/0104346 A1 | 5/2008 | Watanabe et al. |
| 2008/0104347 A1 | 5/2008 | Iwamura et al. |
| 2008/0104443 A1 | 5/2008 | Akutsu et al. |
| 2009/0094403 A1 | 4/2009 | Nakagawa et al. |
| 2009/0106766 A1 | 4/2009 | Masuda |
| 2009/0271582 A1 | 10/2009 | Ninose |
| 2010/0205479 A1 | 8/2010 | Akutsu et al. |
| 2010/0313068 A1 | 12/2010 | Watanabe et al. |
| 2011/0154102 A1* | 6/2011 | Akutsu ............... G06F 11/2058 714/6.1 |
| 2011/0302447 A1 | 12/2011 | Watanabe et al. |
| 2011/0320754 A1* | 12/2011 | Ichikawa ............... G06F 3/0605 711/165 |
| 2012/0030440 A1* | 2/2012 | Miwa .................... G06F 3/0617 711/162 |
| 2012/0203988 A1 | 8/2012 | Nakagawa et al. |
| 2012/0297157 A1* | 11/2012 | Iwamura ............. G06F 11/2076 711/162 |
| 2013/0246724 A1* | 9/2013 | Furuya ................. G06F 3/0655 711/162 |
| 2013/0283000 A1* | 10/2013 | Satoyama ............ G06F 3/0608 711/162 |
| 2014/0068233 A1 | 3/2014 | Ueda |
| 2015/0142915 A1* | 5/2015 | Nagami ................ G06F 3/0607 709/217 |
| 2015/0227600 A1* | 8/2015 | Ramu ............... G06F 17/30575 707/654 |

FOREIGN PATENT DOCUMENTS

| | | |
|---|---|---|
| JP | 2009-093316 A | 4/2009 |
| JP | 2009-104421 A | 5/2009 |
| JP | 2014-048787 A | 3/2014 |

* cited by examiner

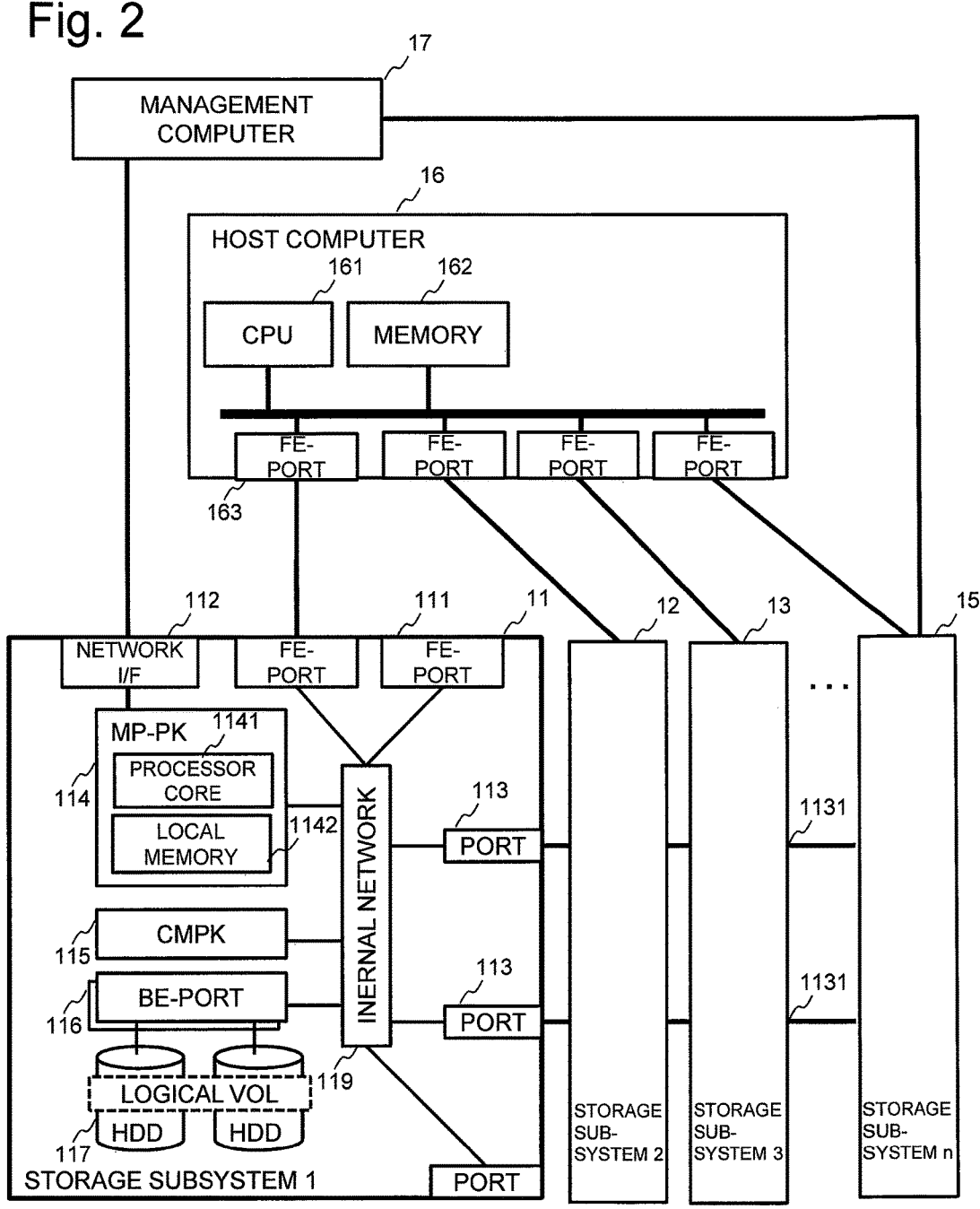

Fig. 3

(1) (C01), (C05), ((C02), (C06)) VOL MANAGEMENT TABLE OF STORAGE 1

| REAL VOL NAME | VIRTUAL VOL NAME | VOL TYPE | VOL STORAGE DESTINATION OF HA PAIR |
|---|---|---|---|
| A1 | A | HA-PVOL | A2 OF STORAGE 2 |
| B1(B2) | B | HA-PVOL | B2 (B1) OF STORAGE 3 |
| C | C | Simplex | NONE |
| ... | ... | ... | ... |

(2) (C01), (C05), ((C02), (C06)) VOL MANAGEMENT TABLE OF STORAGE 2

| REAL VOL NAME | VIRTUAL VOL NAME | VOL TYPE | VOL STORAGE DESTINATION OF HA PAIR |
|---|---|---|---|
| A2 | A | HA-SVOL | A1 OF STORAGE 1 |
| ... | ... | ... | ... |

(3) (C01), (C05), ((C02), (C06)) VOL MANAGEMENT TABLE OF STORAGE 3

| REAL VOL NAME | VIRTUAL VOL NAME | VOL TYPE | VOL STORAGE DESTINATION OF HA PAIR |
|---|---|---|---|
| B2(B1) | B | HA-SVOL | B1 (B2) OF STORAGE 1 |
| ... | ... | ... | ... |

Fig. 4
(1) (C04), (C08), ((C03), (C07)) VOL MANAGEMENT TABLE OF STORAGE 1
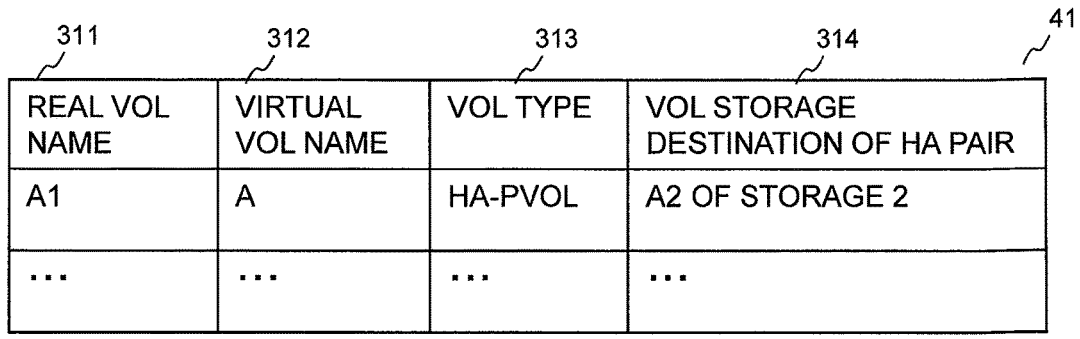
(2) (C04), (C08), ((C03), (C07)) VOL MANAGEMENT TABLE OF STORAGE 2
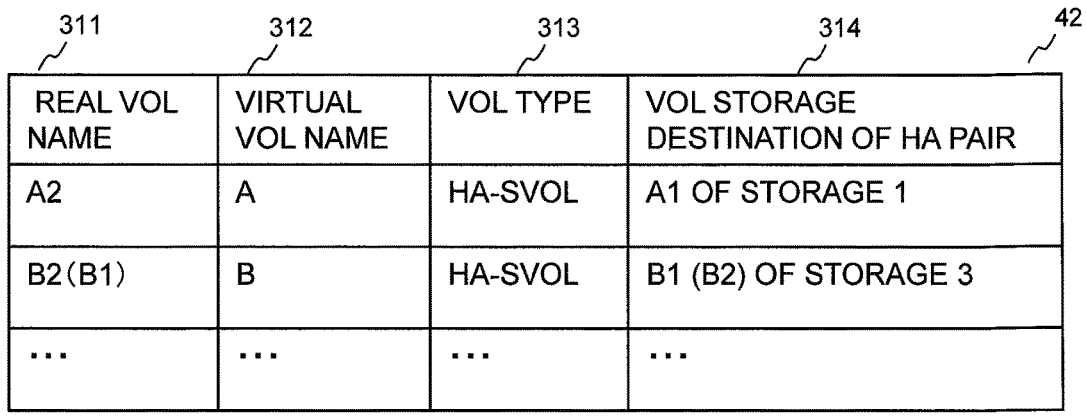
(3) (C04), (C08), ((C03), (C07)) VOL MANAGEMENT TABLE OF STORAGE 3
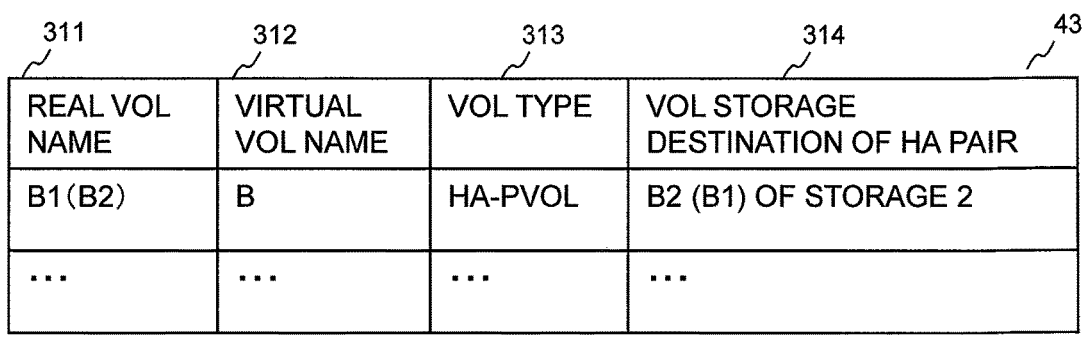

STORAGE SYSTEM, STORAGE DEVICE, AND DATA TRANSFER METHOD

TECHNICAL FIELD

The present invention relates to a storage system, a storage subsystem and a data migration method.

BACKGROUND ART

In a storage system, one or more storage subsystems using HDDs (Hard Disk Drives) and SSDs (Solid State Drives) as storage device, for example, are provided. The storage system including such storage subsystems is accessed from multiple superior devices (such as host computers) via a Storage Area Network (SAN) or a Local Area Network (LAN). Generally, in storage subsystems, the reliability is enhanced by using a method for enhancing reliability accompanying a RAID (Redundant Array of Independent (or Inexpensive) Disks) technique.

Patent Literature 1 discloses enhancing the efficiency of copy control in correspondence to an off-load data transfer function, that is, performing off-load of the function to copy data performed by the host computer to the storage subsystem.

Patent Literature 2 discloses an information system capable of improving availability, wherein a first volume of a first storage and a second volume of a second storage are provided as identical volumes to superior devices. The host computer recognizes the first volume and the second volume as an identical volume having different paths.

CITATION LIST

Patent Literature

[PTL 1] United States Patent Application Publication No. 2014/0068233
[PTL 2] United States Patent Application Publication No. 2009/0271582

SUMMARY OF INVENTION

Technical Problem

In an environment where the storage subsystems provide virtual volumes to the host computer, as according to Patent Literature 2, when the host computer instructs to perform off-load data copy taught in Patent Literature 1, a virtual volume recognized from the side of the host computer is specified as the copy source. In such case, there are two entities of the volume that can be the copy source, which are the first volume and the second volume, each storing the same data, so that there are multiple copy paths. Therefore, it is necessary for the storage subsystem to select an optimum path in response to the instruction to perform off-load data copy.

Solution to Problem

In order to solve the above-described problem, a storage system according to one preferred embodiment of the present invention adopts an HA (High Availability) pair configuration where a first volume of a first storage subsystem and a second volume of a second storage subsystem respectively respond a same virtual ID (Identifier) to the host, wherein when the first storage subsystem or the second storage subsystem receives an instruction of an off-load data copy specifying a virtual ID as a copy destination from the host computer, the system selects either the first volume or the second volume as a copy source volume corresponding to the storage subsystem in which a copy destination volume exists, and copies data from the selected copy source volume to the copy destination volume.

Advantageous Effects of Invention

According to the storage system of the present invention, an HA pair configuration is adopted to realize high reliability so that the system can operate even when a whole storage subsystem goes down, and the system enables an off-load data copy that realizes enhanced performance such as the cutting down of data processing time and reduction of load of the host computer, and also realizes efficient use of resources. The problems, configurations and effects other than those described above will become apparent from the following description of the preferred embodiments.

BRIEF DESCRIPTION OF DRAWINGS

FIG. 2 is an overall configuration diagram of a storage system.
FIG. 3 is a view illustrating a configuration example of a VOL management table.
FIG. 4 is a view illustrating a configuration example of a VOL management table.

DESCRIPTION OF EMBODIMENTS

Figure 1:
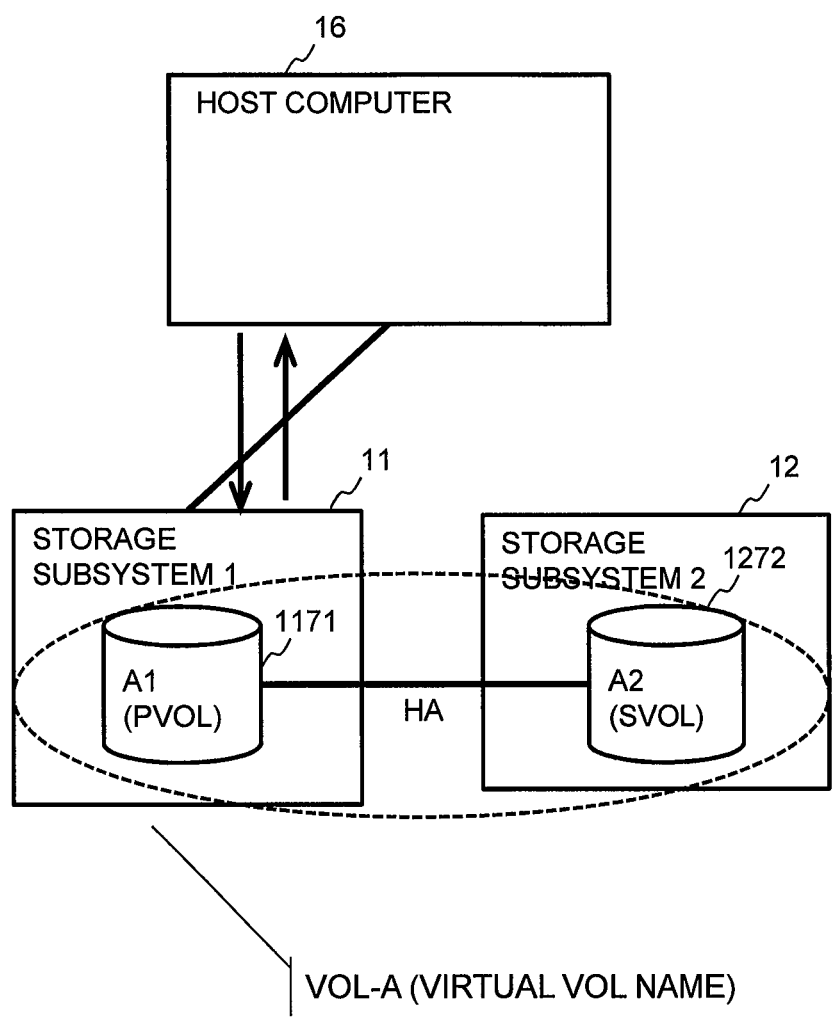
FIG. 1 is a view illustrating a concept of HA pair configuration.

Now, the preferred embodiments of the present invention will be described with reference to the drawings. In the following description, various information are referred to as "management tables", for example, but the various information can also be expressed by data structures other than tables. Further, the "management table" can also be referred to as "management information" to indicate that the information does not depend on the data structure.

The processes are sometimes described using the term "program" as the subject. The program is executed by a processor such as an MP (Micro Processor) or a CPU (Central Processing Unit) for performing determined processes. A processor can also be the subject of the processes since the processes are performed using appropriate storage resources (such as memories) and communication interface devices (such as communication ports). The processor can also use dedicated hardware in addition to the CPU. The computer programs can be installed to each computer from a program source. The program source can be provided via a program assignment server or a storage media, for example.

Each element, such as each controller, can be identified via numbers, but other types of identification information such as names can be used as long as they are identifiable information. The equivalent elements are denoted with the same reference numbers in the drawings and the description of the present invention, but the present invention is not restricted to the present embodiments, and other modified examples in conformity with the idea of the present invention are included in the technical scope of the present invention. The number of each component can be one or more than one, unless defined otherwise.

<HA Pair Configuration>

FIG. 1 is a view illustrating a concept of HA pair configuration. A storage system has a "storage subsystem 1" (11) accessed from a host computer 16, a "storage subsystem 2" (12), and a management computer (not shown) for managing the storage subsystem 1 11 and the storage subsystem 2 12. Each storage subsystem has one or more physical volumes composed within the subsystem, and provides an A1-VOL (PVOL (Primary Volume)) 1171 and an A2-VOL (SVOL (Secondary Volume)) 1272 to the host computer 16 as virtual VOL-A.

Further, in the storage subsystem adopting an HA pair configuration, the following configuration is adopted to process the I/O from the host computer 16:

(HA1) Data is synchronously replicated in two physical volumes (VOL-A1 (PVOL) 1171 and VOL-A2 (SVOL) 1272).

(HA2) An active-active configuration is realized where both VOLs perform I/O processing simultaneously, by enabling access to both VOL-A1 (PVOL) 1171 and VOL-A2 (SVOL) 1272.

(HA3) In response to an Inquiry command from the host computer 16, both VOL-A1 (PVOL) 1171 and VOL-A2 (SVOL) 1272 respond the same serial number of the same virtual device or a device ID for uniquely identifying the device, and a virtual volume name ("virtual VOL-A" in FIG. 1) or a virtual VOL-ID (also referred to as virtual ID) for uniquely identifying the virtual volume. Therefore, the host computer 16 can access both VOLs of the HA pair configuration of VOL-A1 1272 of the virtual storage subsystem 1 11 and VOL-A2 of the storage subsystem 2 12 by designating the virtual device serial number assigned to the VOL of one pair of HA pair configuration and the virtual VOL name ("virtual VOL-A" in FIG. 1).

(HA4) From the side of the host computer 16, both VOL-A1 (PVOL) 1171 and VOL-A2 (SVOL) 1272 are accessed via the same VOL name A. During the write process, at first, data is written into VOL-A1 (PVOL) 117, and thereafter, data is written into VOL-A2 (SVOL) 1272.

The above configuration is adopted to process the I/O from the host computer 16.

<Storage System>

FIG. 2 is an overall configuration diagram of a storage system. The storage system is equipped with a host computer 16, multiple storage subsystems 11 through 15, and a management computer 17 for managing the storage subsystems 11 through 15.

The host computer 16 is equipped with a CPU 161 for controlling the whole subsystem, a memory for storing control information, control programs and the like of the subsystem, and an FE (Front End)-PORT 163 for performing I/F with the storage subsystem. The management computer 17 has a similar configuration as the host computer 16.

The storage subsystems 11 through 15 are each equipped with components including an FE-PORT 111 for performing I/F with the host computer 16, a network I/F 112 for communicating with the management computer 17, a PORT 113 for realizing communication among storage subsystems, multiple MPPKs (Micro Processor Packages) 114 for controlling the whole subsystem, a CMPK (Cache Memory Package) 115 for temporarily storing the data from/to the host computer 16 and the data from/to the HDD 117, and a BE (Back End)-PORT 116 for controlling transmission and reception of data to/from the HDD 117, and further has an internal network 119 connecting the respective components. Further, the MPPK 114 has multiple processor cores 1141, and a local memory 1142 storing control programs and control data used by the respective processor cores.

Further, storage subsystems 11 through 15 use multiple HDDs 117 to constitute a logical volume, and perform an off-load data copy of the constituted logical volume to a logical volume of a different storage subsystem using the PORT 113 and a connecting line 1131 (such as a Fibre Channel protocol or a LAN). The off-load data copy processing is performed by the MPPK 114 having ownership for accessing the respective logical volumes or the processor core 1141 within the MPPK 114.

<Off-Load Data Copy>

An off-load data copy is a function for executing the replicating (copying) and migrating functions (copying and deleting), which are processes primarily performed by the host computer 16, by the storage subsystems instead of by the host computer 16. According to this off-load data copy function, the host computer 16 can execute the copying process without performing input and output of the copy target data. Thereby, the effect of reduction of resources (CPU and memory) used by the host computer 16, and the shortening of processing time due to the reduction of the amount of communication between the host computer 16 and the storage subsystems can be expected.

Mainly, there are the following two methods, method (1) and method (2), as off-load data copy.

(1) A Single Command (Single) Off-Load Data Copy (Hereinafter Referred to as SCOPY Command)

An SCOPY command is composed of the following information: a copy source virtual volume name (hereinafter referred to as copy source volume), a copy destination virtual volume name (hereinafter referred to as copy destination volume), a copy data storage source in the copy source volume, and a copy data storage destination in the copy destination volume. For example, an address range shown for example by a storage start LBA (Logical Block Address) and a number of storage blocks is stored in the copy data storage source and the copy data storage destination. It is also possible to use a copy source virtual volume ID (copy source VOL-ID) or a copy destination virtual volume ID (copy destination VOL-ID) for uniquely identifying the virtual volume instead of the copy source virtual copy name or the copy destination virtual volume name in the SCOPY command.

The host computer 16 issues an off-load copy command (SCOPY command) from the copy source volume (VOL-A) to the copy destination volume (VOL-B) to the storage subsystem 1 11, and the issued command is received by the storage subsystem 1 11. Then, the MPPK-A (also referred to as ownership MPPK) in charge of processing the I/O to the copy source volume (VOL-A) reads the data from the copy source volume (VOL-A). Further, the MPPK-B in charge of processing the I/O to the copy destination volume (VOL-B) receives the data read from the copy source volume (VOL-A) from the MPPK-A and writes the same to the copy destination volume (VOL-B). The SCOPY command can be received by any volume as long as the copy source volume and the copy destination volume are in the same storage subsystem. It is also possible to have the copy destination volume (VOL-B) receive the SCOPY command, and perform the off-load data copy between the copy source volume (VOL-A).

Further, it is also possible to have a third VOL-C, which is different from the copy source volume (VOL-A) and the copy destination volume (VOL-B), receive the SCOPY command and control the off-load data copy. In that case, the MPPK-C (VOL-C) having received the SCOPY command issues a read command to the MPPK-A (VOL-A) and a write command to the MPPK-B (VOL-B) to have the data copy executed. Thereby, read is executed by the copy source volume (VOL-A), and write of the read data is executed by the copy destination volume (VOL-B). There is no difference in the off-load data copy processing depending on the volume receiving the SCOPY command. Therefore, a case where the copy source volume (VOL-A) receives the SCOPY command will be mainly described in the present embodiment.

(2) Multi-Command (Multi) Copy (Token Method, Hereinafter Referred to as TCOPY Command)

At first, the host computer 16 issues a token acquisition command composed of the information of a copy source virtual copy name and a copy data storage source in the copy source virtual volume to the storage subsystem 1 11 (for example, VOL-A). The storage subsystem 1 11 having received the token acquisition command generates a token by adding a token ID uniquely identifying a token to the information of the copy source virtual copy name and the copy data storage source in the copy source virtual volume, and returns the same to the host computer 16.

Next, the host computer 16 transmits a TCOPY command composed of a copy destination virtual volume name, a copy data storage destination in the copy source virtual volume and the received token to the copy destination volume of the storage subsystem 1 11. The storage subsystem 1 11 having received the TCOPY command performs an off-load data copy from VOL-A to VOL-B. According to the TCOPY command, the host computer transmitting the token can be the host computer having issued the token acquisition command, or a different host computer having received a replica of the token from the host computer having executed the token acquisition command. Further, similar to the SCOPY command, a copy source virtual volume ID (copy source VOL-ID) or a copy destination virtual volume ID (copy destination VOL-ID) for uniquely identifying a virtual volume can be used instead of the copy source virtual copy name or the copy destination virtual volume name.

<Off-Load Data Copy Patterns>

In the present embodiment, we will consider a case where the copy source (VOL-A) of the off-load data copy specified by the host computer 16 is a virtual volume having an HA configuration composed of real volumes VOL-A1 (PVOL) and VOL-A2 (SVOL), and the copy destination (VOL-B) of the off-load data copy specified by the host computer 16 is a virtual volume having an HA configuration composed of real volumes VOL-B1 (PVOL) and VOL-B2 (SVOL). According to this state, the following cases exist, depending on the allocation of the real volumes constituting VOL-A and VOL-B in the storage subsystem and the off-load data copy method.

Case 1 (C01): VOL-A1 and VOL-B1 are disposed in same subsystem (SCOPY command)
Case 2 (C02): VOL-A1 and VOL-B2 are disposed in same subsystem (SCOPY command)
Case 3 (C03): VOL-A2 and VOL-B1 are disposed in same subsystem (SCOPY command)
Case 4 (C04): VOL-A2 and VOL-B2 are disposed in same subsystem (SCOPY command)
Case 5 (C05): VOL-A1 and VOL-B1 are disposed in same subsystem (TCOPY command)
Case 6 (C06): VOL-A1 and VOL-B2 are disposed in same subsystem (TCOPY command)
Case 7 (C07): VOL-A2 and VOL-B1 are disposed in same subsystem (TCOPY command)
Case 8 (C08): VOL-A2 and VOL-B2 are disposed in same subsystem (TCOPY command)
Case 11 (C11): VOL-A1 and VOL-B1 are disposed in different subsystems
Case 12 (C12): VOL-A1 and VOL-B2 are disposed in different subsystems
Case 13 (C13): VOL-A2 and VOL-B1 are disposed in different subsystems
Case 14 (C14): VOL-A2 and VOL-B2 are disposed in different subsystems As for the copy operation in different subsystems from cases 11 (C11) through 14 (C14), "copy to a different subsystem (remote copy)" is used instead of "copy within the same subsystem (local copy)" regarding the cases within the same subsystem. Further, "search of volumes within connected subsystems" is executed instead of "search of volumes within the same subsystem". In the following description, volumes are referred to as VOL-A1 (PVOL), VOL-A2 (SVOL), VOL-B1 (PVOL) and VOL-B2 (SVOL), wherein VOL-A1 (PVOL) and VOL-A2 (SVOL) are copy source VOLs which constitute an HA pair configuration, and VOL-B1 (PVOL) and VOL-B2 (SVOL) are copy destination VOLs which constitute an HA pair configuration. Further, VOL-A is a virtual VOL name pointing to VOL-A1 and VOL-A2, and VOL-B is a virtual VOL name pointing to VOL-B1 and VOL-B2. In the present embodiment, it is not necessary for both the copy source VOL and the copy destination VOL to constitute the HA pair configuration, and only either one should constitute the HA pair configuration.

<VOL Management Table>

FIGS. 3 and 4 are views illustrating a configuration example of VOL management tables. A VOL management table 1 is a volume management table for (C01), (C05), (C02) and (C06). A table for the storage subsystem 1 11 (storage 1) is a VOL management table 31, a table for the storage subsystem 2 12 (storage 2) is a VOL management table 32, and a table for storage subsystem 3 14 (storage 3) is a VOL management table 33. The VOL management table 1 includes a real VOL name 311, a virtual VOL name 312, a VOL type 313, and an HA pair VOL storage destination 314. The VOL management table 31/VOL management table 32/VOL management table 33 are respectively stored in local memories 1142 of storage 1 11/storage 2 12/storage 3 13, but it is also possible to store all three VOL management tables in the local memory 1142 of each storage subsystem.

The references in the brackets of the real VOL name 311 and the HA pair VOL storage destination 314 in the VOL management table 31 and the VOL management table 33 correspond to the cases (C02) and (C06), and the other information is the same for all four cases.

For example, what is meant by the real VOL name 311 of the VOL management table 31 being "B1 (B2)" is that the name is "B1" in cases (C01) and (C05), and "B2" in cases (C02) and (C06). Further, what is meant by the HA pair VOL storage destination 314 being "B2 (B1) of storage 3" is that the destination is "B2 of storage 3" in cases (C01) and (C05), and "B1 of storage 3" in cases (C02) and (C06). In any case, the virtual VOL name 312 is "B" and the VOL type 313 is "HA-PVOL".

Similarly, what is meant by the real VOL name 311 of the VOL management table 33 being "B2 (B1)" is that the name is "B2" in cases (C01) and (C05), and "B1" in cases (C02) and (C06). Further, what is meant by the HA pair VOL storage destination 314 being "B1 (B2) of storage 1" is that the destination is "B1 of storage 1" in cases (C01) and (C05), and "B2 of storage 1" in cases (C02) and (C06). In any case, the virtual VOL name 312 is "B" and the VOL type 313 is "HA-SVOL".

The VOL management table 1 manages the volumes of the respective storage subsystems, and by having the MPPK 114 search the VOL management table 1, it becomes possible to recognize in which storage system the necessary volume exists, and which volume adopts a simplex configuration or HA pair configuration in the VOL management table 1.

The VOL management table 2 is a volume management table for (C04), (C08), (C03) and (C07). A table for the storage subsystem 1 11 is a VOL management table 41, a table for the storage subsystem 2 12 (storage 2) is a VOL management table 42, and a table for a "storage subsystem 3" (13) (storage 3) is a VOL management table 43. The VOL management table 2 includes a real VOL name 311, a virtual VOL name 312, a VOL type 313, and an HA pair VOL storage destination 314, similar to the VOL management table 1. The VOL management table 1 and the VOL management table 2 can be collectively called a VOL management table.

The references in the brackets of the real VOL name 311 and the HA pair VOL storage destination 314 in the VOL management table 42 and the VOL management table 43 refer to cases (C03) and (C07), and the other information is the same for all four cases.

For example, what is meant by the real VOL name 311 of the VOL management table 42 being "B2 (B1)" is that the name is "B2" in cases (C04) and (C08), and "B1" in cases (C03) and (C07). Further, what is meant by the HA pair VOL storage destination 314 being "B1 (B2) of storage 3" is that the destination is "B1 of storage 3" in cases (C04) and (C08), and "B2 of storage 3" in cases (C03) and (C07). In any case, the virtual VOL name 312 is "B" and the VOL type 313 is "HA-SVOL".

Similarly, what is meant by the real VOL name 311 of the VOL management table 43 being "B1 (B2)" is that the name is "B1" in cases (C04) and (C08), and "B2" in cases (C03) and (C07). Further, what is meant by the HA pair VOL storage destination 314 being "B2 (B1) of storage 2" is that the destination is "B2 of storage 2" in cases (C04) and (C08), and "B1 of storage 2" in cases (C03) and (C07). In any case, the virtual VOL name 312 is "B" and the VOL type 313 is "HA-PVOL".

Similar to the VOL management table 1, the MPPK 114 searches the VOL management table 2 and specifies the configuration of the volumes within the storage subsystem.

Next, we will describe the off-load data copy operation based on the SCOPY command for the respective cases.

<C01: VOL-A1 and VOL-B1 are Disposed in Same Subsystem (SCOPY)>

Figure 5:
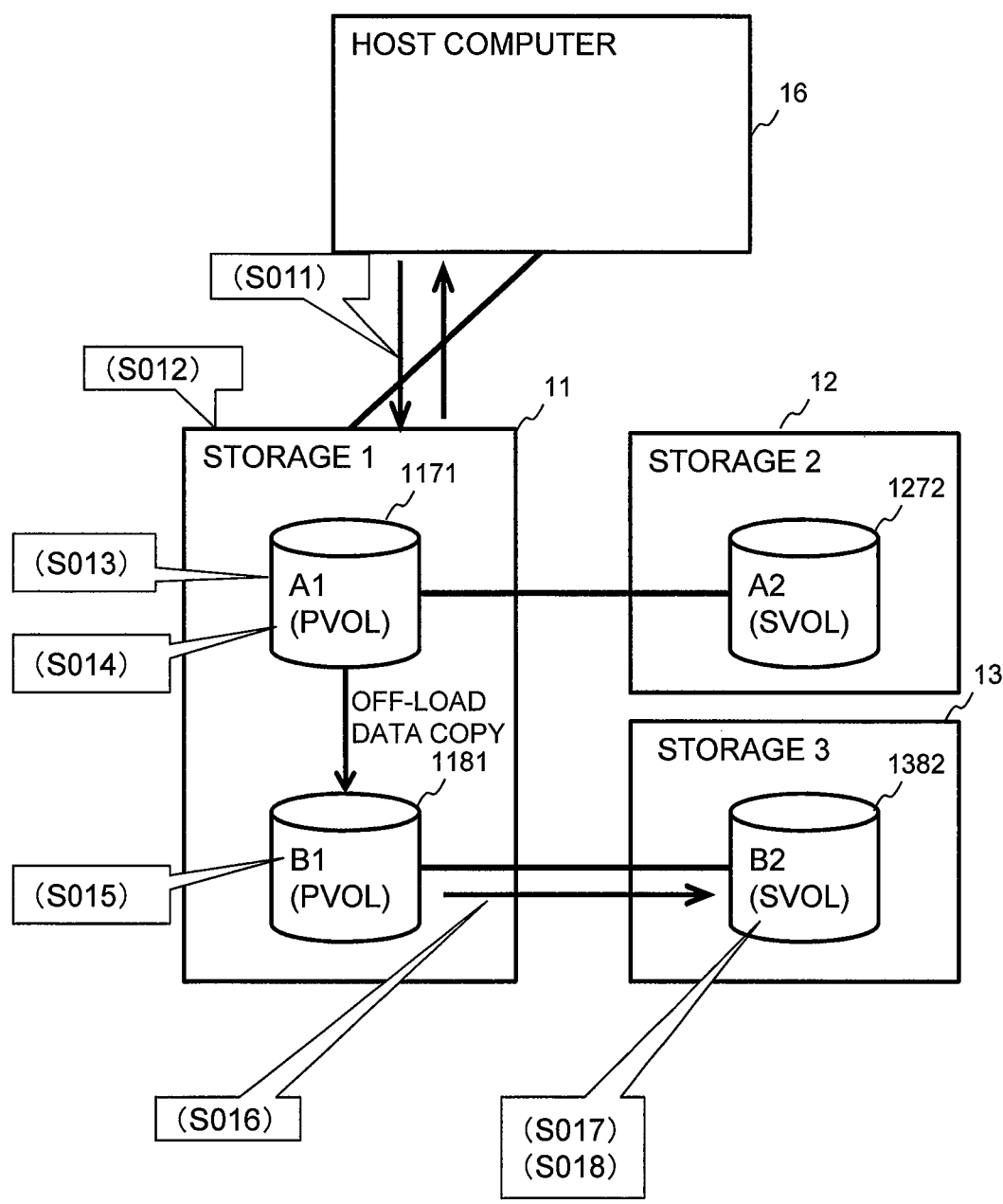
FIG. 5 is a view illustrating a first off-load data copy operation.

In the SCOPY command, "VOL-A" is stored in the copy source volume name, "VOL-B" is stored in the copy destination volume name, and address information is stored respectively in the copy data storage source and the copy data storage destination. FIG. 5 is a view illustrating a first off-load data copy operation. In this case, it is assumed that VOL-A1 (PVOL) 1171 and VOL-B1 (PVOL) 1181 are disposed in the same subsystem, which is the storage 1 11.

In S011, the host computer 16 transmits an off-load copy command (SCOPY command) for copying data from the copy source VOL-A to the copy destination VOL-B to the MPPK 114 in charge of the VOL-A1 (PVOL) 1171 of the storage 1 11. In S012, the MPPK 114 in charge of the VOL-A1 (PVOL) 1171 of the storage 1 11 receives the SCOPY command to the VOL-A1 (PVOL) 1171. In S013, the MPPK 114 in charge of the VOL-A1 (PVOL) 1171 searches the volumes within the same storage (storage 1 11) in which the VOL-A1 (PVOL) 1171 exists by the VOL management table 31. As a result of the search, the MPPK 114 in charge of the VOL-A1 (PVOL) 1171 finds VOL-A (VOL-A1 (PVOL) 1171) and VOL-B (VOL-B1 (PVOL) 1181) in the storage 1 11. Further, the MPPK 114 in charge of the VOL-A1 (PVOL) 1171 determines based on the HA pair VOL storage destination 314 in the VOL management table 31 that the VOL-A1 (PVOL) 1171 and the VOL-A2 (SVOL) 1272 of the storage 2 12 constitute an HA pair configuration, and that the VOL-B1 (PVOL) 1181 and the VOL-B2 (SVOL) 1382 of the storage 3 13 constitute an HA pair configuration. According to this search, it becomes possible to specify in which storage subsystem the copy source volume and the copy destination volume according to the SCOPY command exist, and to recognize the status of HA pair configuration.

In S014, the MPPK 114 in charge of the VOL-A1 (PVOL) 1171 reads the copy target data specified by the information of the copy data storage source from the VOL-A1 (PVOL) 1171, and writes the read data to the cache memory of the CMPK 115. In S015, the MPPK 114 in charge of the VOL-B1 (PVOL) 1181 writes the copy target data read from the cache memory to the copy data storage destination in VOL-B1 (PVOL) 1181.

In S016, the MPPK 114 in charge of the VOL-B1 (PVOL) 1181 determines that the VOL-B2 (SVOL) 1382 and the VOL-B1 (PVOL) 1181 constitute an HA pair configuration based on the result of searching the VOL management table 31, and transfers the write command of the copy target data having VOL-B2 (SVOL) 1382 as destination to the MPPK 114 of the storage 3 13. In S017, the MPPK 114 in charge of the VOL-B2 (SVOL) 1382 of the storage 3 13 receives the write command. In S018, the MPPK 114 in charge of the VOL-B2 (SVOL) 1382 writes the copy target data to the VOL-B2 (SVOL) 1382.

Regarding VOL-A1 (PVOL) 1171, there are two cases: a case where the volume is a single volume (Simplex) that does not constitute an HA pair configuration, and a case where the volume is an HA pair configuration volume (HA-PVOL). Also regarding VOL-B1 (PVOL) 1181, there are two cases, a case where the volume is a single volume that does not constitute an HA pair configuration, and a case where the volume is an HA pair configuration volume. When the VOL-B1 (PVOL) 1181 constitutes an HA pair configuration with the VOL-B2 (SVOL) 1382, the copy target data will be written first to the VOL-B1 (PVOL) 1181 and then to the VOL-B2 (SVOL) 1382 in the named order.

Further, as mentioned earlier, the volume receiving the SCOPY command is only required to be a volume in the same subsystem as the VOL-A1 (PVOL) 1171. The SCOPY command received by the MPPK 114 in charge of processing I/O of volumes other than the VOL-A1 (PVOL) 1171 will transfer the process to the MPPK 114 in charge of processing the VOL-A1 (PVOL) 1171. Therefore, the processes performed after transferring the SCOPY command will be the same as the processes of S011 through S018 described above. Further, the contents of the processing are the same even when the VOL-A1 is the SVOL and the VOL-A2 is the PVOL. The process performed when the VOL-A2 (SVOL) receives the SCOPY command is the same as the process performed by switching the PVOL and the SVOL of VOL-A in (C03) mentioned later.

As described, the VOL-A1 (PVOL) 1171 having received the off-load data copy command (SCOPY command) can write the copy target data to the VOL-B1 (PVOL) 1181 and the VOL-B2 (SVOL) 1382 constituting an HA pair configuration therewith. Therefore, the data copy between volumes constituting an HA pair configuration, which had been performed by the host computer 16 in the prior art, can be performed between storage subsystems only, so that the data processing time of the host computer 16 can be reduced and the load thereof can be cut down and enhancement of performance and efficient use of resources can be realized.

<C02: VOL-A1 and VOL-B2 are Disposed in Same Subsystem (SCOPY)>

Figure 6:
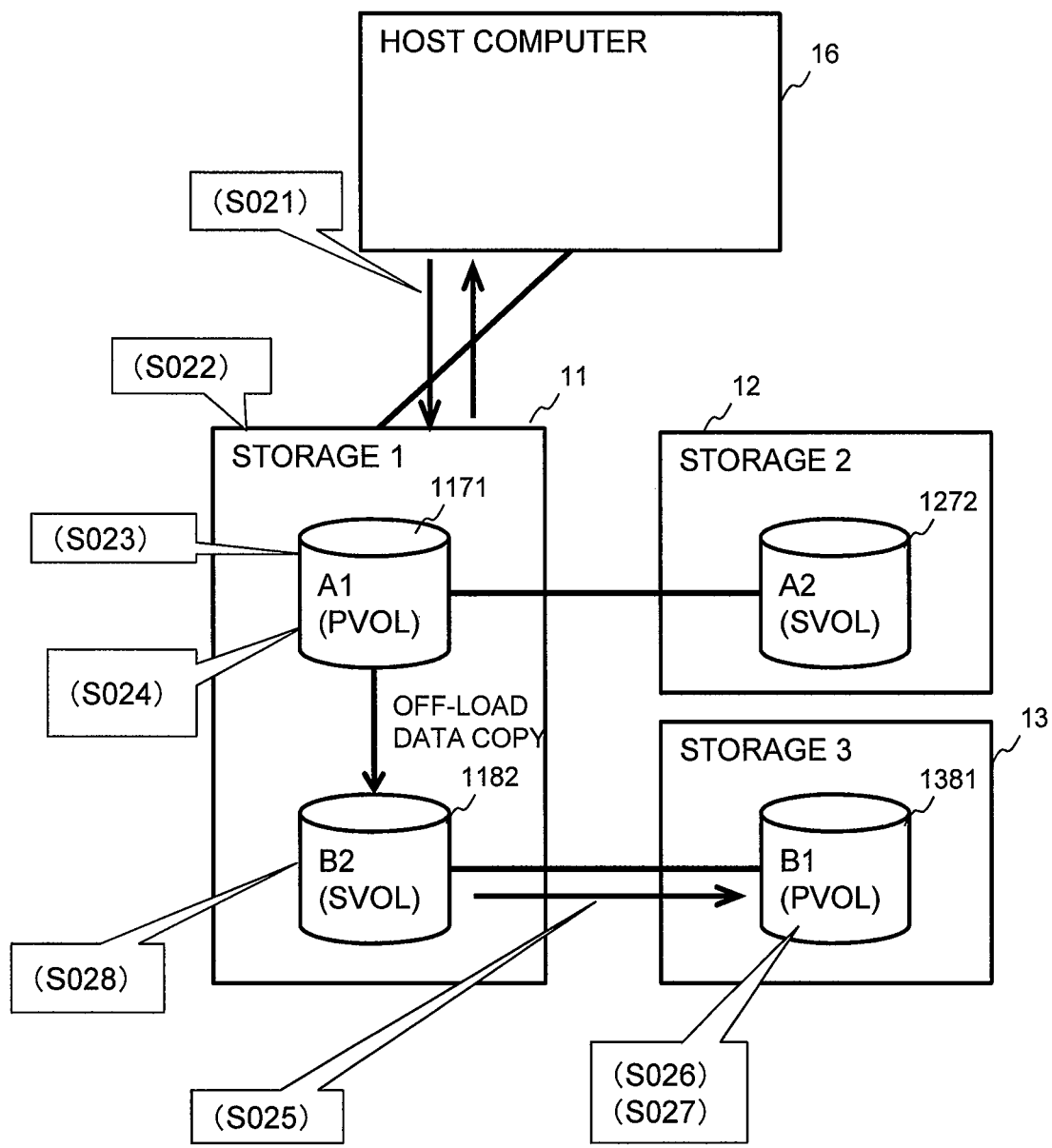
FIG. 6 is a view illustrating a second off-load data copy operation.

FIG. 6 is a view illustrating a second off-load data copy operation. In this case, it is assumed that VOL-A1 (PVOL) 1171 and VOL-B2 (SVOL) 1182 are disposed in the same subsystem, which is the storage 1 11.

In S021, the host computer 16 transmits an SCOPY command for copying data from copy source VOL-A to copy destination VOL-B to the MPPK 114 in charge of the VOL-A1 (PVOL) 1171 of the storage 1 11. In S022, the MPPK 114 in charge of the VOL-A1 (PVOL) 1171 of the storage 1 11 receives the SCOPY command. In S023, the MPPK 114 in charge of the VOL-A1 (PVOL) 1171 searches the volumes within the same storage subsystem (storage 1 11) in which the VOL-A1 (PVOL) 1171 exists by the VOL management table 31. As a result of the search, the MPPK 114 in charge of the VOL-A1 (PVOL) 1171 finds the VOL-A (VOL-A1 (PVOL) 1171) and the VOL-B (VOL-B2 (SVOL) 1182). Further, the MPPK 114 in charge of the VOL-A1 (PVOL) 1171 determines based on the HA pair VOL storage destination 314 in the VOL management table 31 that the VOL-A1 (PVOL) 1171 and the VOL-A2 (SVOL) 1272 of the storage subsystem 2 12 constitute an HA pair configuration, and that the VOL-B2 (SVOL) 1182 and the VOL-B1 (PVOL) 1381 of the storage 3 13 constitute an HA pair configuration.

In S024, the MPPK 114 in charge of the VOL-A1 (PVOL) 1171 reads the copy target data from the VOL-A1 (PVOL) 1171, and writes the read data to the cache memory of the CMPK 115. In S025, the MPPK 114 in charge of the VOL-A1 (PVOL) 1171 determines based on the result of searching the VOL management table 31 that the VOL-B2 (SVOL) 1182 and the VOL-B1 (PVOL) 1381 constitute an HA pair configuration, and transfers the write command of the copy target data to the MPPK 114 in charge of the VOL-B1 (PVOL) 1381 of the storage 3 13.

In S026, the MPPK 114 in charge of the VOL-B1 (PVOL) 1381 receives the write command of the copy target data. In S027, the MPPK 114 in charge of the VOL-B1 (PVOL) 1381 writes the copy target data to the VOL-B1 (PVOL) 1381. Then, the MPPK 114 in charge of the VOL-B1 (PVOL) 1381 transmits the write complete report to the MPPK 114 in charge of the VOL-B2 (SVOL) 1182. In S028, the MPPK 114 in charge of the VOL-B2 (SVOL) 1182 of the storage 1 11 writes the copy target data to the VOL-B2 (SVOL) 1182 after receiving the write complete report. As described, the host computer 16 can execute the off-load data copy only among storages, by issuing an SCOPY command to the storage subsystem.

The contents of the processing are the same even when the VOL-A1 is the SVOL and the VOL-A2 is the PVOL. The processing performed when the VOL-A2 (SVOL) receives the SCOPY command is the same as the process of (C04) described later with the PVOL and SVOL of the VOL-A switched. In the case of HA pair configuration, the data can be read from either the PVOL or the SVOL, but when writing data, the data is necessarily written to the PVOL before being written to the SVOL, so as to synchronize the data between volumes constituting the HA pair configuration. Therefore, in VOL-B, when the SVOL first receives the write command, the write command is transferred to the PVOL, and after data write to the PVOL is completed, the write to the SVOL is executed. Also in this case, an effect similar to (C01) can be achieved.

<C03: VOL-A2 and VOL-B1 are Disposed in Same Subsystem (SCOPY)>

Figure 7:
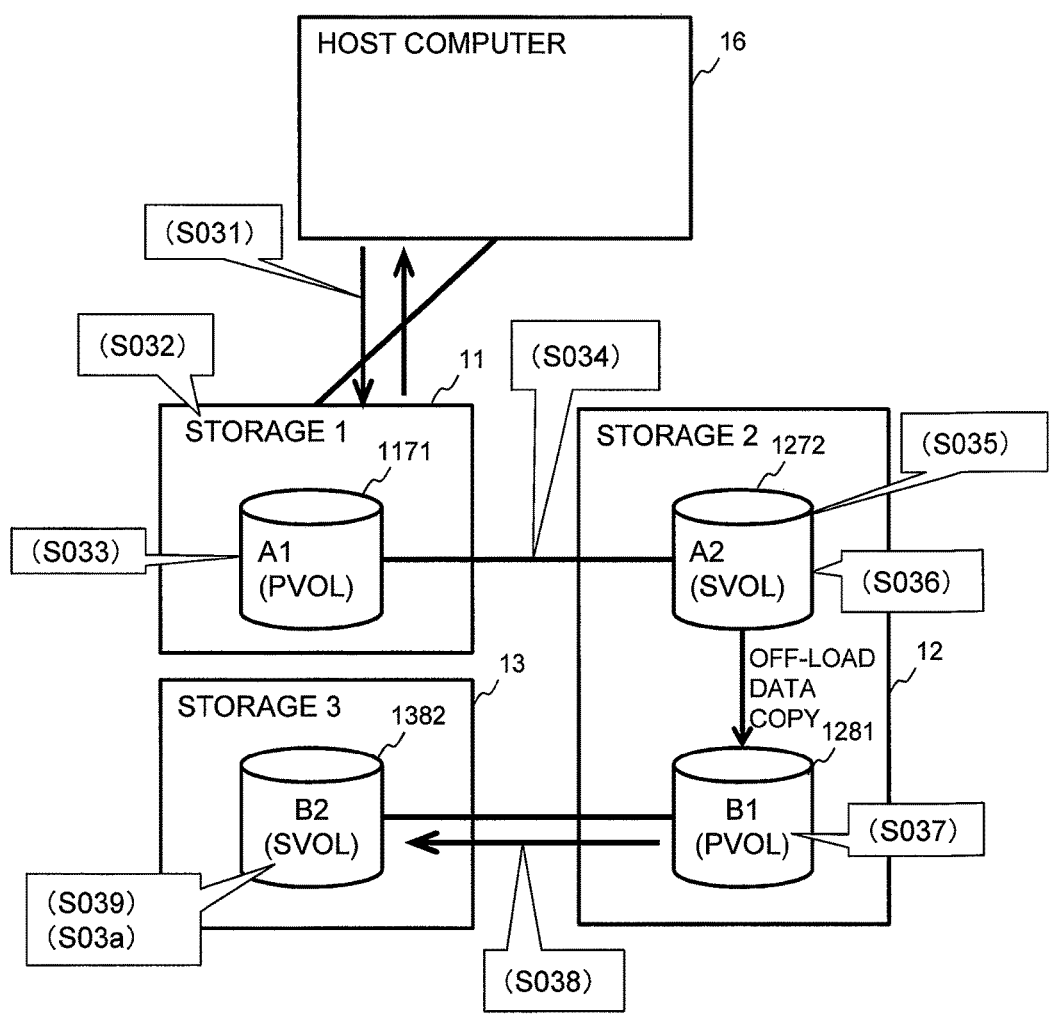
FIG. 7 is a view illustrating a third off-load data copy operation.

FIG. 7 is a view showing a third off-load data copy operation. In this case, it is assumed that VOL-A2 (SVOL) 1272 and VOL-B1 (PVOL) 1281 are disposed in the same subsystem, which is the storage 2 12.

In S031, the host computer 16 transmits the SCOPY command for copying data from the copy source VOL-A to the copy destination VOL-B to the MPPK 114 in charge of the VOL-A1 (PVOL) 1171 of the storage 1 11. In S032, the MPPK 114 in charge of the VOL-A1 (PVOL) 1171 receives the SCOPY command. In S033, the MPPK 114 searches the volumes in the same storage 1 11 in which the VOL-A1 (PVOL) 1171 exists in the VOL management table 41. As a result of the search, the MPPK 114 finds the VOL-A (VOL-A1 (PVOL) 1171), but it cannot find VOL-B (not found). Further, the MPPK 114 finds VOL-A2 (SVOL) 1272 constituting an HA pair configuration with the VOL-A1 (PVOL) 1171 in the storage 2 12.

In S034, the MPPK 114 in charge of the VOL-A1 (PVOL) 1171 transfers the SCOPY command to the storage 2 12. In S035, the MPPK 114 in charge of the VOL-A2 (SVOL) 1272 receives the SCOPY command, and searches the VOL management table 42. As a result, it finds VOL-A2 (SVOL) 1272 and VOL-B1 (PVOL) 1281 in the storage 2 12. Further, the MPPK 114 recognizes from the VOL management table 42 that the VOL-B2 (SVOL) 1382 constituting an HA pair configuration with the VOL-B1 (PVOL) 1281 exists in the storage 3 13.

In S036, the MPPK 114 in charge of the VOL-A2 (SVOL) 1272 reads the copy target data from the VOL-A2 (SVOL) 1272, and writes the read data to the cache memory of the CMPK 115. In S037, the MPPK 114 in charge of the VOL-B1 (PVOL) 1281 writes the copy target data read from the cache memory to the VOL-B1 (PVOL) 1281.

In S038, the MPPK 114 in charge of the VOL-B1 (PVOL) 1281 transfers the write command of the copy target data for writing to the VOL-B2 (SVOL) 1382 constituting an HA pair configuration with the VOL-B1 (PVOL) 1281 to the MPPK 114 in charge of the VOL-B2 (SVOL) 1382 of the storage 3 13. In S039, the MPPK 114 in charge of the VOL-B2 (SVOL) 1382 receives the write command. In S03a, the MPPK 114 in charge of the VOL-B2 (SVOL) 1382 writes the copy target data to the VOL-B2 (SVOL) 1382. As described, the host computer 16 can execute the off-load data copy between storages only by merely issuing a SCOPY command to the storage subsystem.

Regarding VOL-B1 (PVOL) 1281, there are two cases: a case where the volume is a single volume that does not constitute an HA pair configuration, and a case where the volume is an HA pair configuration volume. Further, the contents of the processing are the same even when the VOL-A1 is the SVOL and VOL-A2 is the PVOL. The processing performed in the case where the VOL-A2 (SVOL) receives the SCOPY command is the same as the processing performed by switching the PVOL and the SVOL of VOL-A in the aforementioned (C01).

<C04: VOL-A2 and VOL-B2 are Disposed in Same Subsystem (SCOPY)>

Figure 8:
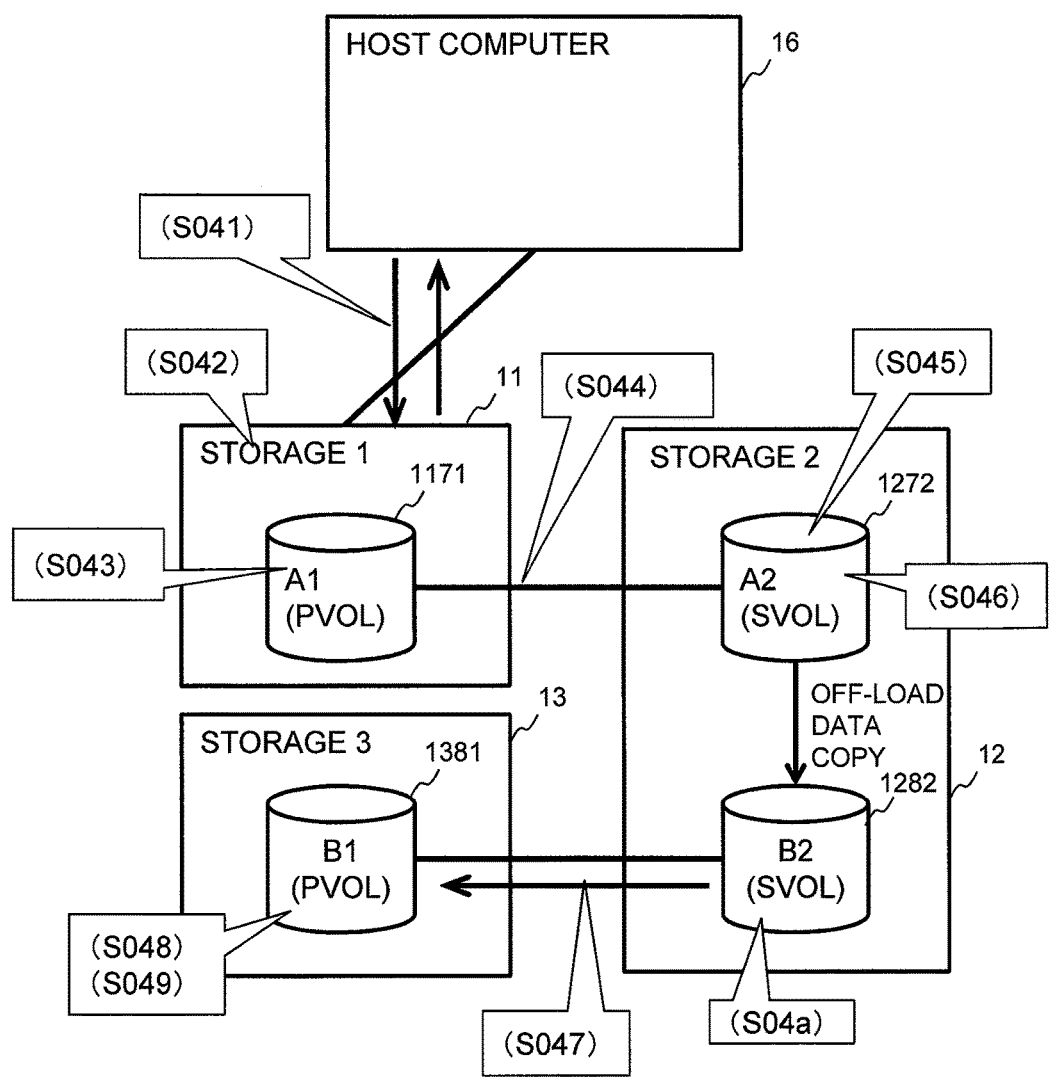
FIG. 8 is a view illustrating a fourth off-load data copy operation.

FIG. 8 illustrates a fourth off-load data copy operation. In this case, it is assumed that VOL-A2 (SVOL) 1272 and VOL-B2 (SVOL) 1282 are disposed in the same subsystem, which is the storage 2 12.

In S041, the host computer 16 transmits an SCOPY command for copying data from the copy source VOL-A to the copy destination VOL-B to the MPPK 114 in charge of the VOL-A1 (PVOL) 1171 of the storage 1 11. In S042, the MPPK 114 in charge of the VOL-A1 (PVOL) 1171 receives the SCOPY command. In S043, the MPPK 114 in charge of the VOL-A1 (PVOL) 1171 searches the volumes within the same storage 1 11 in which the VOL-A1 (PVOL) 1171 exists by the VOL management table 41. As a result of the search, the MPPK 114 in charge of VOL-A1 (PVOL) 1171 finds VOL-A (VOL-A1 (PVOL) 1171), but it cannot find VOL-B (not found). Further, the MPPK 114 in charge of the VOL-A1 (PVOL) 1171 finds VOL-A2 (SVOL) 1272 constituting an HA pair configuration with VOL-A1 (PVOL) 1171 in the storage 2 12.

In S044, the MPPK 114 in charge of the VOL-A1 (PVOL) 1171 transfers the off-load data copy command (SCOPY command) to the MPPK 114 in charge of the VOL-A2 (SVOL) 1272 of the storage 2 12. In S045, the MPPK 114 in charge of the VOL-A2 (SVOL) 1272 having received the SCOPY command searches the VOL management table 42. As a result, it finds the VOL-A2 (SVOL) 1272 and the VOL-B2 (SVOL) 1282 in the storage 2 12. Further, the MPPK 114 recognizes based on the VOL management table 42 that VOL-B1 (PVOL) 1381 constituting an HA pair configuration with VOL-B2 (SVOL) 1282 exists in the storage 3 13.

In S046, the MPPK 114 in charge of the VOL-A2 (SVOL) 1272 reads the copy target data from the VOL-A2 (SVOL) 1272, and writes the read data to the cache memory of the CMPK 115. Then, the MPPK 114 in charge of the VOL-A2 (SVOL) 1272 transmits the write command to the MPPK 114 in charge of the VOL-B2 (SVOL) 1282. In S047, the MPPK 114 in charge of the VOL-B2 (SVOL) 1282 transfers the write command of the copy target data to the MPPK 114 in charge of the VOL-B1 (PVOL) 1381 constituting an HA pair configuration recognized by the search result of the VOL management table 31. In S048, the MPPK 114 in charge of VOL-B1 (PVOL) 1381 of the storage 3 13 receives the write command. In S049, the MPPK 114 in charge of VOL-B1 (PVOL) 1381 writes the copy target data to the VOL-B1 (PVOL) 1381. Then, the MPPK 114 in charge of VOL-B1 (PVOL) 1381 transmits a write complete report in VOL-B1 (PVOL) 1381 to the MPPK 114 in charge of VOL-B2 (SVOL) 1282. In S03a, the MPPK 114 in charge of VOL-B2 (SVOL) 1282 writes the copy target data to VOL-B2 (SVOL) 1282. As described, the host computer 16 can execute the off-load data copy between storages only by simply issuing a SCOPY command to the storage subsystem.

The contents of the processing are the same even if the VOL-A1 is the SVOL and the VOL-A2 is the PVOL. The processing performed in the case where the VOL-A2 (SVOL) has received the SCOPY command is the same as the processing performed when the PVOL and SVOL of VOL-A has been switched in the aforementioned (C02).

<Main Processing of SCOPY Command>

Figure 9:
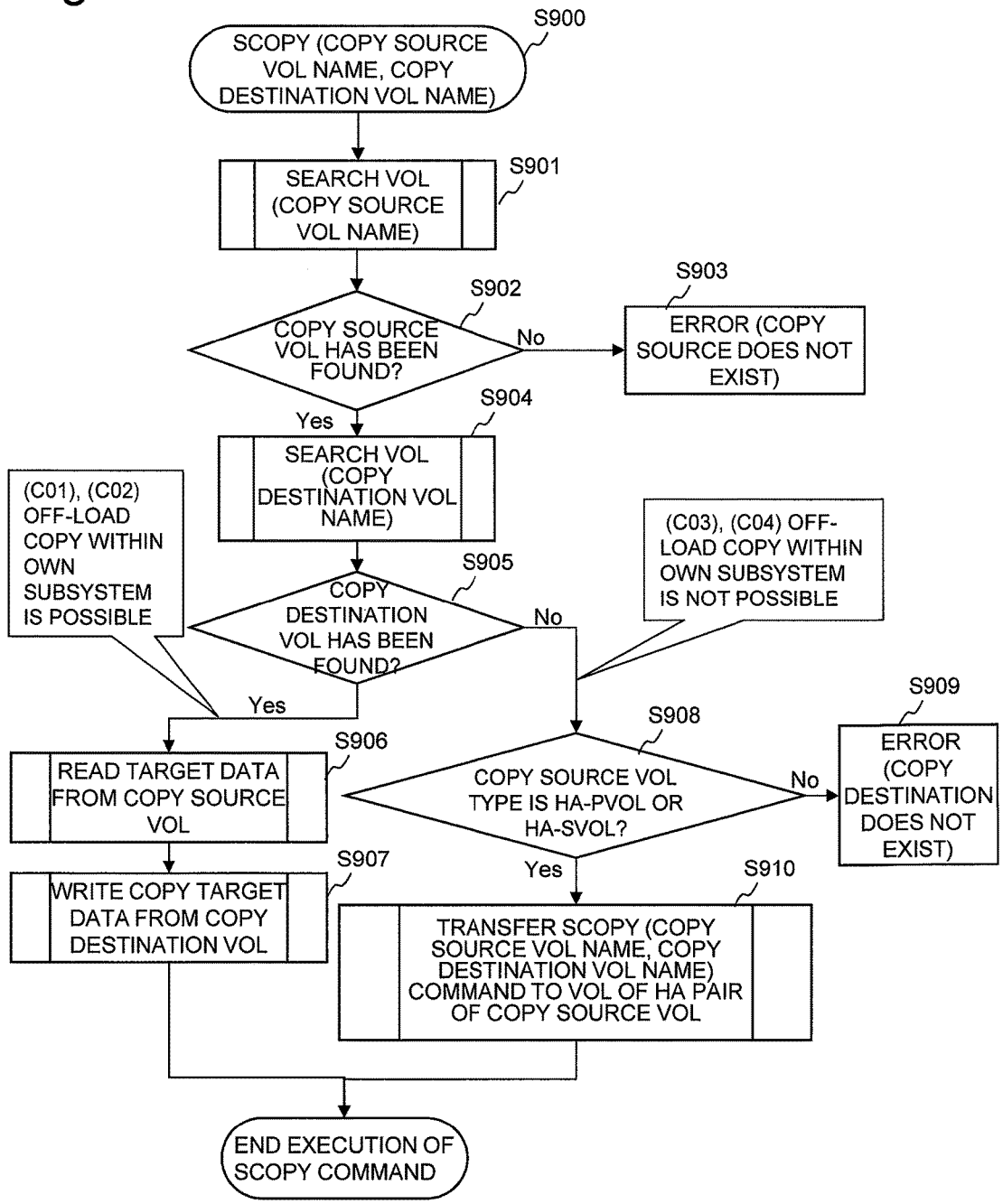
FIG. 9 is a flowchart illustrating a main processing according to the first to fourth off-load data copy operations.

FIG. 9 is a flowchart illustrating a main processing of the first to fourth off-load data copy operation. In order to simplify the description, the subject of the processing is simply referred to as the MPPK 114.

In S900, the MPPK 114 receives an SCOPY command (copy source VOL name, copy destination VOL name, copy data storage source, and copy data storage destination) from the host computer 16. In S901, the MPPK 114 searches the VOL management table 31/41, and finds the copy source VOL name. In S902, the MPPK 114 determines whether the copy source VOL has been found or not. If the copy source VOL has been found (Yes), the MPPK 114 executes S904. If it has not been found (No), the MPPK 114 executes S903, and transmits an error report that the copy source VOL does not exist to the host computer 16. Further, the processes of S901 and S902 can be executed for all the storage subsystems connected to the storage subsystem having received the SCOPY command, so as to find the copy source VOL.

In S904, the MPPK 114 searches the VOL management table 31/41 and finds the copy destination VOL name. In S905, the MPPK 114 determines whether the copy destination VOL has been found or not. If the copy destination VOL is found (Yes), the MPPK 114 determines that off-load data copy within its own subsystem is possible, and executes S906. The aforementioned cases (C01) and (C02) correspond. If it is not found (No), the MPPK 114 determines that off-load data copy within its own subsystem is not possible, and executes S908.

In S906, the MPPK 114 reads the copy target data specified by the copy data storage source from the copy source VOL, and writes the read copy target data to the to the cache memory of the CMPK 115. In S907, the MPPK 114 reads the copy target data stored in the cache memory of the CMPK 115, and writes the read copy target data to the copy data storage destination in the copy destination VOL. Then, after all the copy target data has been copied, the MPPK 114 ends the main processing of the SCOPY command, and transmits the copy completion report to the host computer 16.

In S908, the MPPK 114 determines whether the copy source VOL type is an HA-PVOL or an HA-SVOL based on the VOL type 313 in the VOL management table 31/41. If it is an HA pair configuration (Yes), the MPPK 114 executes S910. If it is not an HA pair configuration (No), the MPPK 114 execute S909, and transmits an error report to the host computer 16 that a copy destination VOL does not exist.

In S910, the MPPK 114 transfers an SCOPY command to the storage subsystem in which the HA pair VOL of the copy source VOL exists. The process performed in the storage subsystem to which the SCOPY command is transferred will be described in FIG. 10. Then, the MPPK 114 ends the execution of the SCOPY command. During the time from the start of the read of the copy target data to the end of the write process (S906 and S907 through S910), the copy target data is subjected to write lock so that it is not changed by other processes.

<Main Processing Performed in the Storage Subsystem Having Received SCOPY Command>

Figure 10:
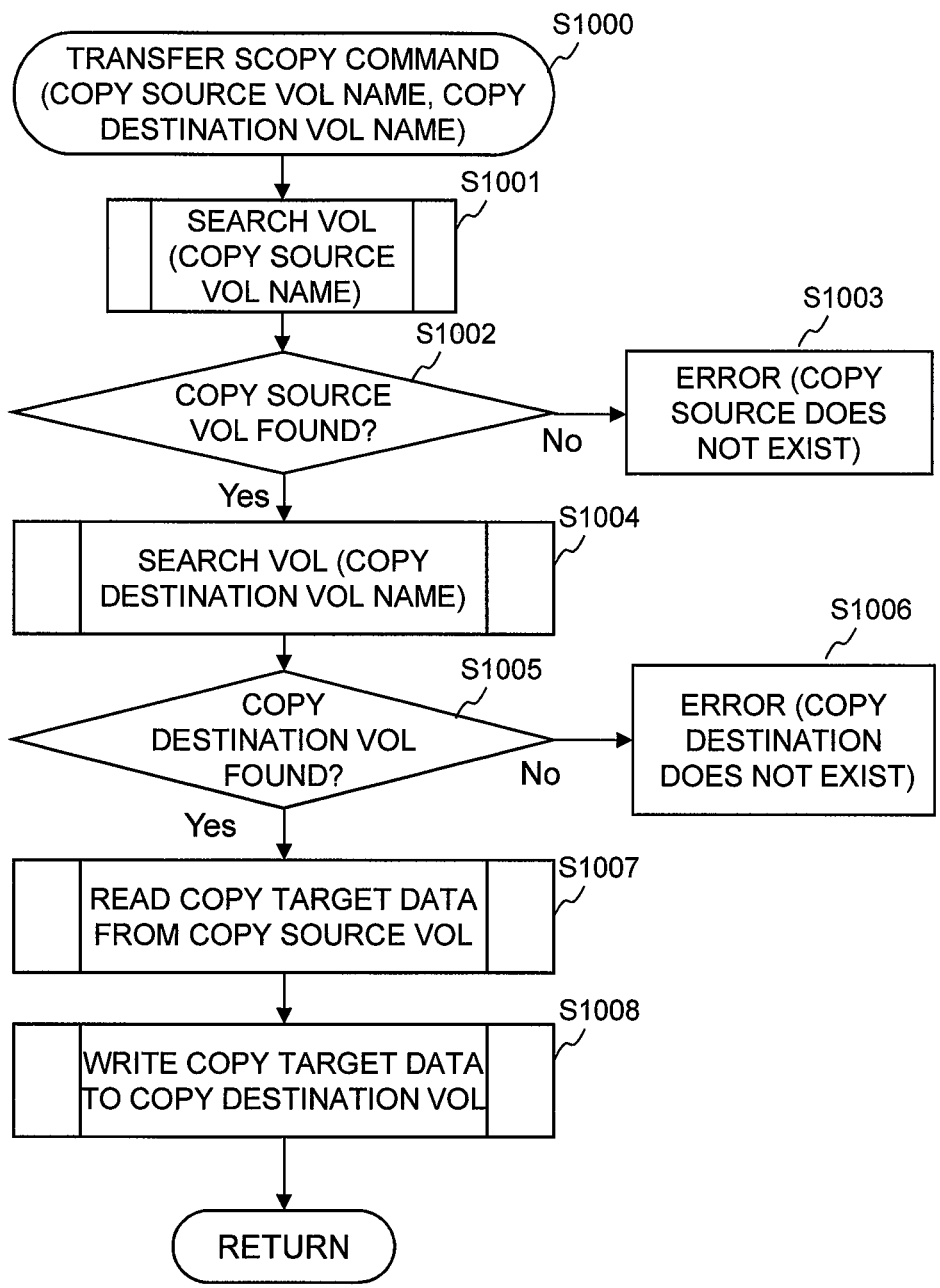
FIG. 10 is a flowchart illustrating an off-load data copy processing performed on the side of a volume having received the transferred off-load data copy command (SCOPY command).

FIG. 10 is a flowchart illustrating an off-load data copy processing performed in the storage subsystem side having received the transferred off-load data copy command (SCOPY command). The present process is started when the storage subsystem receives the transferred SCOPY command in (C03) and (C04).

In S1000, the MPPK 114 receives the SCOPY command having been transferred from another storage subsystem. In S1001, the MPPK 114 searches the VOL management table 31/41, and finds the copy source VOL name specified by the SCOPY command. In S1002, the MPPK 114 determines whether the copy source VOL has been found or not. If the copy source VOL has been found (Yes), the MPPK 114 executes S1004. If it has not been found (No), the MPPK 114 executes S1003, and transmits an error report notifying that the copy source VOL does not exist to the host computer 16. It is also possible to execute the processes of S1001 and S1002 to all the storage subsystems connected to the storage subsystem having received the transferred SCOPY command, so as to find the copy source VOL.

In S1004, the MPPK 114 searches the VOL management table 31/41 and finds the copy destination virtual VOL name (copy destination VOL) specified by the SCOPY command. In S1005, the MPPK 114 determines whether the copy destination VOL has been found or not. If the copy destination VOL has been found (Yes), the MPPK 114 executes S1007. If it has not been found (No), the MPPK 114 executes S1006, and sends an error report notifying that the copy destination VOL does not exist to the host computer 16. It is possible to execute the processes of S1004 and S1005 to all the storage subsystems connected to the storage subsystem having received the transferred SCOPY command, so as to find the copy destination VOL.

In S1007, the MPPK 114 reads the copy target data from the copy data storage source specified by the SCOPY command in the copy source VOL, and writes the read copy target data to the cache memory of the CMPK 115. In S1008, the MPPK 114 reads the copy target data stored in the cache memory of the CMPK 115, and writes the read copy target data to the copy data storage destination specified by the SCOPY command in the copy destination VOL. After the process of S1008 is completed, the process is returned to S910 of FIG. 9. The VOL search processing according to the aforementioned S901, S904, S1001 and S1004 will be described with reference to FIG. 11.

<Search Processing>

Figure 11:
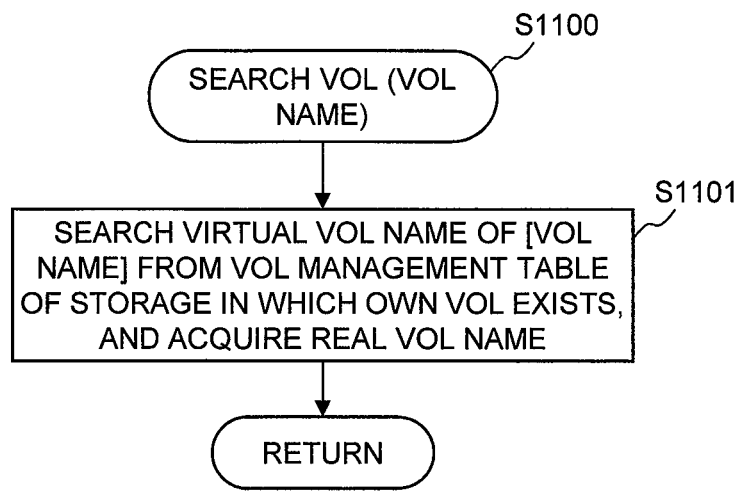
FIG. 11 is a flowchart illustrating a volume search processing.

FIG. 11 is a flowchart showing a volume search processing. In S1100, the MPPK 114 starts a VOL search processing (VOL name search). In S1101, the MPPK 114 finds a virtual VOL name corresponding to an argument (copy source VOL name or copy destination VOL name) from the virtual VOL name 312 in the VOL management table of the storage subsystem in which its own VOL exists. The MPPK 114 acquires a real VOL name corresponding to the virtual VOL name having been found from the real VOL name 311 of the VOL management table. The MPPK 114 hands over the acquired real VOL name to the call routine of the present processing, and ends the processing. If the corresponding real VOL does not exist, it hands over an error report or information such as NULL (vacant) to the call routine.

<VOL Read Processing>

Figure 12:
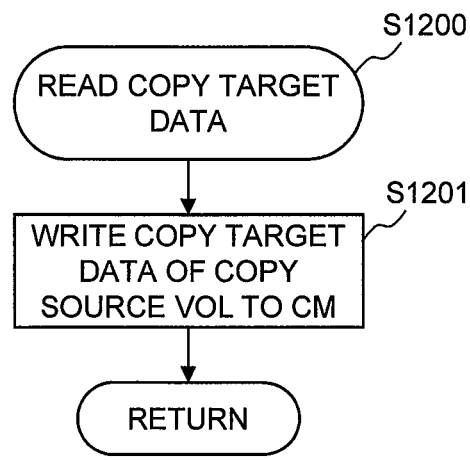
FIG. 12 is a flowchart illustrating a processing for reading data from a volume.

FIG. 12 is a flowchart showing a data read processing from the volume. In S1200, the MPPK 114 starts a process for reading the copy target data from the volume corresponding to the VOL name (copy source VOL name) specified by the argument. In S1201, the MPPK 114 reads the data from the copy source volume, and writes the read copy target data to the cache memory of the CMPK 115. The read processing is a process for simply reading the copy target data from the volume regardless of whether the volume is single VOL (VOL type 313 is "Simplex")/PVOL/SVOL.

<VOL Write Processing>

Figure 13:
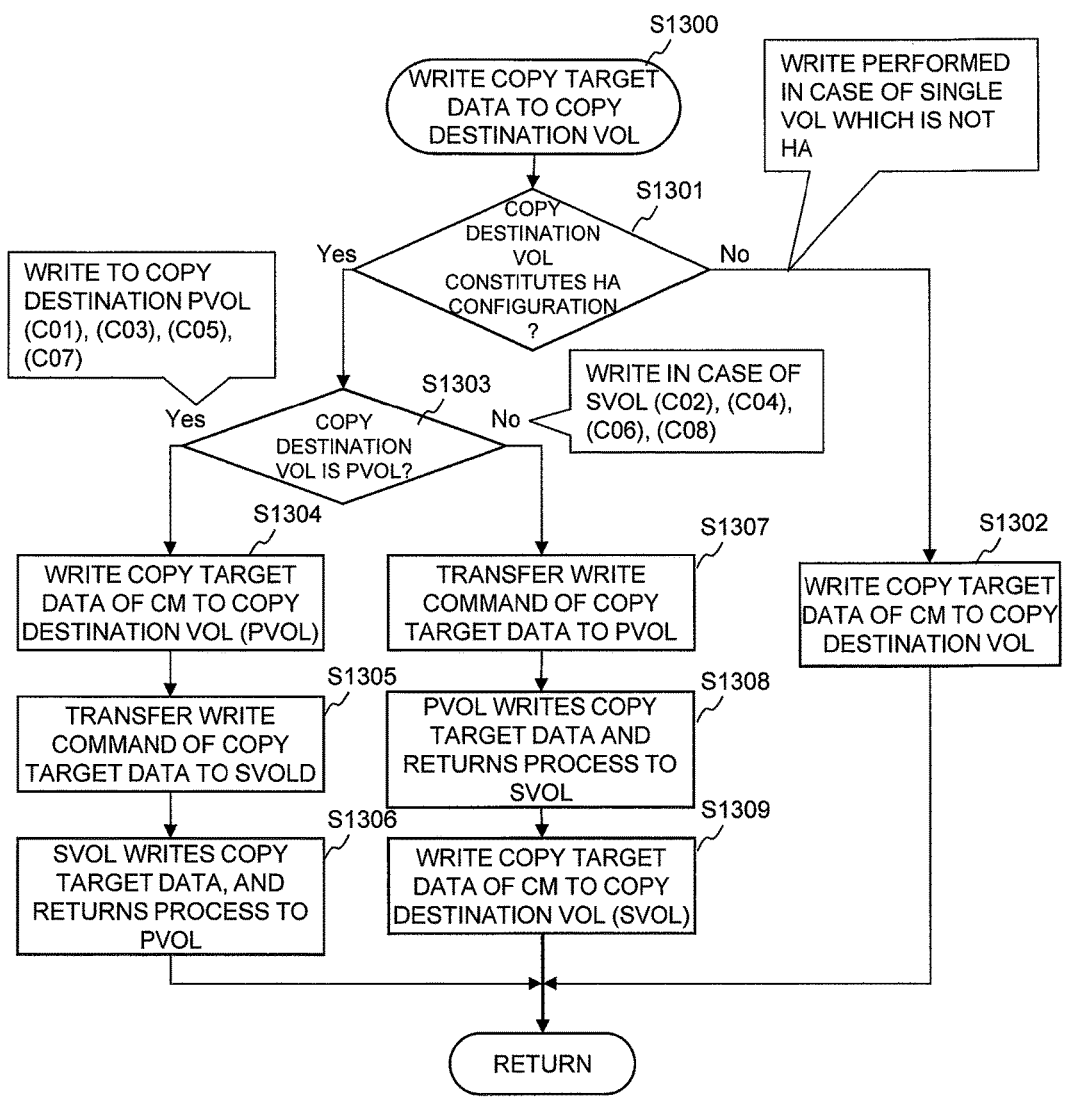
FIG. 13 is a flowchart illustrating a processing for writing data to the volume.

FIG. 13 is a flowchart showing a data write processing to the volume. In S1300, the MPPK 114 starts a process to write the copy target data to the volume corresponding to the VOL name (copy destination VOL name) specified by the argument.

In S1301, the MPPK 114 determines whether the copy destination VOL is an HA pair configuration or not. If it is not an HA pair configuration (No), the copy destination VOL is a single VOL, and the MPPK 114 executes S1302 to write the copy target data to the single VOL. If the VOL is an HA pair configuration (Yes), the MPPK 114 executes S1303. In S1302, the MPPK 114 reads the copy target data stored in the cache memory of the CMPK 115 in the read processing of FIG. 12, and writes the read copy target data to the copy destination VOL.

In S1303, the MPPK 114 determines whether the copy destination VOL is a PVOL or not. If it is a PVOL (Yes), the MPPK 114 executes the processes of S1304 and thereafter to write the copy target data to the copy destination PVOL. This write operation performed to the copy destination PVOL corresponds to four cases; (C01), (C03), (C05) and (C07). If the copy destination VOL is not a PVOL but an SVOL (No), the MPPK 114 executes the processes of S1307 and thereafter to write the copy target data to the copy destination SVOL. This write operation to the copy destination SVOL corresponds to four cases; (C02), (C04), (C06) and (C08).

In S1304, the MPPK 114 reads the copy target data stored in the cache memory of the CMPK 115, and writes the read copy target data to the copy destination VOL (PVOL). In S1305, the MPPK 114 transfers the write command of the copy target data to the MPPK 114 in charge of the SVOL constituting the HA pair configuration. In S1306, the MPPK 114 writes the copy target data to the SVOL. Then, it returns the process to the MPPK in charge of the PVOL, and ends the VOL write processing.

In S1307, the MPPK 114 transfers the write command of the copy target data to the MPPK 114 in charge of the PVOL. During the write processing to the VOL, the data is first written to the PVOL before being written to the SVOL to ensure data consistency between the PVOL and the SVOL. In S1308, the MPPK 114 in charge of the PVOL writes the copy target data to the PVOL, and returns the process to the MPPK 114 in charge of the SVOL. In S1309, the MPPK 114 in charge of the SVOL writes the copy target data read from the cache memory of the CMPK 115 to the copy destination VOL (SVOL).

Next, we will describe the off-load data copy operation according to the TCOPY command.

<Handling of Token in HA Pair Configuration>

In the case of HA pair configuration, virtual VOL name is used as the copy source (token issue source). In HA pair configuration, the virtual VOL name is the same both in the PVOL and in the SVOL in pair configuration with the PVOL, so that either one of the VOLs can be used as the copy source. Therefore, even if the volume having issued the token is VOL-A1 (PVOL), VOL-A2 (SVOL) constituting an HA pair with the token issue source can also be used as the copy source. In that case, the token issued by VOL-A1 (PVOL) is copied in VOL-A2 (SVOL) and duplicated. Next, the off-load data copy based on the command (TCOPY command) of the token method will be described.

<C05: VOL-A1 and VOL-B1 are Disposed in Same Subsystem (TCOPY)>

Figure 14:
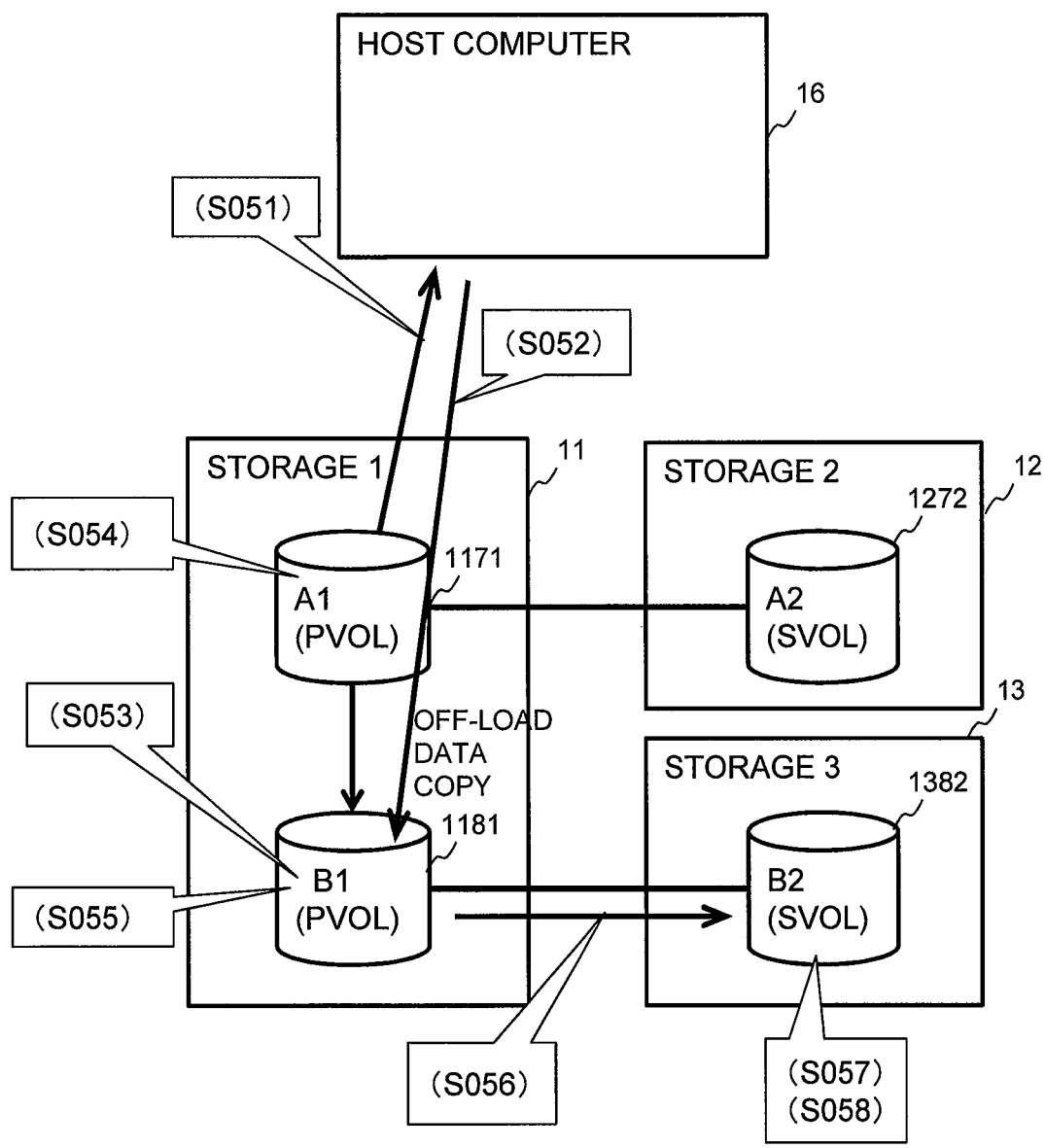
FIG. 14 is a view illustrating a fifth off-load data copy operation.

FIG. 14 is a view illustrating a fifth off-load data copy operation. In the TCOPY command, "VOL-A" is stored in the copy source volume name, "VOL-B" is stored in the copy destination volume name, and address information is respectively stored in the copy data storage source and the copy data storage destination. In the present case, it is assumed that VOL-A1 (PVOL) 1171 and VOL-B1 (PVOL) 1181 are disposed in the same storage subsystem, which is the storage 1 11.

In S051, a token acquisition command is issued from the host computer 16 to VOL-A1 (PVOL) 1171 of the storage 1 11, and the MPPK 114 in charge of VOL-A1 (PVOL) 1171 receives the token acquisition command. The MPPK 114 in charge of VOL-A1 (PVOL) 1171 transmits the token related to the generated copy source VOL-A to the host computer 16, and the host computer 16 acquires the token. In S052, the host computer 16 transmits a TCOPY command including the token of the issue source copy source VOL-A to VOL-B1 (PVOL) 1181, and the MPPK 114 in charge of VOL-B1 (PVOL) 1181 receives the same.

In S053, the MPPK 114 in charge of VOL-B1 (PVOL) 1181 searches the VOLs within the storage 1 11 by the VOL management table 31. As a result of the search, the MPPK 114 finds VOL-A1 (PVOL) 1171 and VOL-B1 (PVOL) 1181. In S054, the MPPK 114 in charge of VOL-A1 (PVOL) 1171 reads the copy target data from VOL-A1 (PVOL) 1171, and writes the read data to the cache memory of the CMPK 115. In S055, the MPPK 114 in charge of VOL-B1 (PVOL) 1181 writes the copy target data read from the cache memory to the VOL-B1 (PVOL) 1181.

In S056, the MPPK 114 in charge of VOL-B1 (PVOL) 1181 transfers the write command of the copy target data to be copied to VOL-B2 (SVOL) 1382 constituting the HA pair configuration recognized by the search result of the VOL management table 31 to the MPPK 114 in charge of VOL-B2 (SVOL) 1382. In S057, the MPPK 114 in charge of VOL-B2 (SVOL) 1382 receives the write command. In S058, the MPPK 114 in charge of VOL-B2 (SVOL) 1382 writes the copy target data to the VOL-B2 (SVOL) 1382.

Incidentally, regarding VOL-A1 (PVOL) 1171, there are two cases: a case where the volume is a single volume that does not constitute an HA pair configuration, and a case where the volume constitutes an HA pair configuration. Further, regarding VOL-B1 (PVOL) 1181, there are two cases: a case where the volume is a single volume that does not constitute an HA pair configuration, and a case where the volume constitutes an HA pair configuration. When VOL-B1 (PVOL) 1181 constitutes an HA pair configuration with VOL-B2 (SVOL) 1382, the copy target data is first written to VOL-B1 (PVOL) 1181 and then to VOL-B2 (SVOL) 1382 in the named order.

Further, the contents of the processing are the same even when VOL-A1 is the SVOL and VOL-A2 is the PVOL. The process performed when the VOL-A2 (SVOL) receives a TCOPY command is the same process as when the PVOL and the SVOL are replaced in the following description of (C07). Even when the VOL-A2 has received an acquisition command of the token to perform a duplication processing of the token when the token is acquired, replication and duplication of the token is performed in VOL-A1. The replication and duplication process of the token can also be executed in (C06), (C07) and (C08).

As described, VOL-B1 (PVOL) which is the copy destination VOL having received the off-load data copy command (TCOPY command) searches the copy source VOL, and the copy target data of the searched copy source VOL can be written to VOL-B2 (SVOL) 1171 constituting an HA pair configuration with VOL-B1 (PVOL). Therefore, the data copy among volumes of the HA pair configuration that has been executed by the host computer 16 in the prior art can be performed between storage subsystems only, so that the data processing time in the host computer 16 can be cut down and the load can be reduced, according to which enhanced performance and efficient use of resource can be realized.

<C06: VOL-A1 and VOL-B2 are Disposed in Same Subsystem (TCOPY)>

Figure 15:
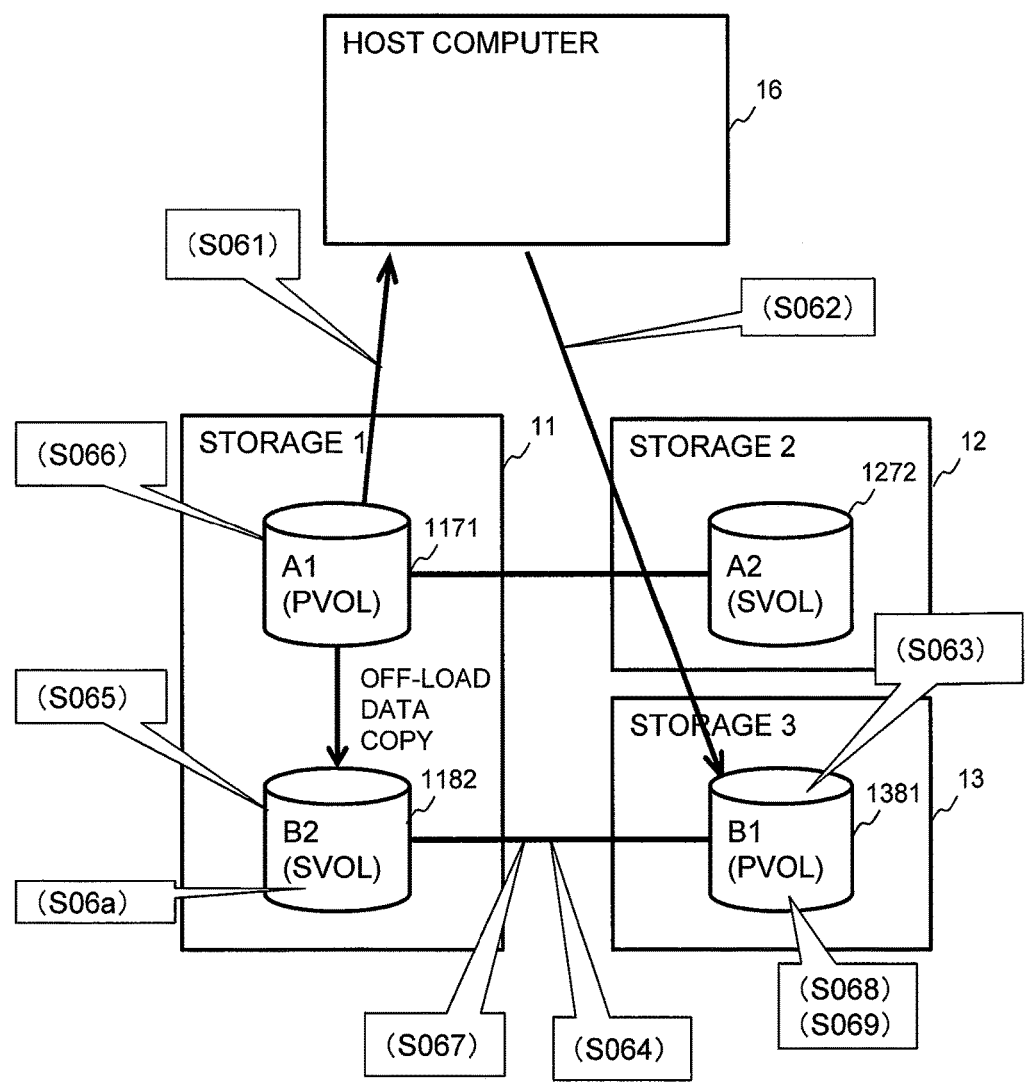
FIG. 15 is a view illustrating a sixth off-load data copy operation.

FIG. 15 is a view illustrating a sixth off-load data copy operation.

In S061, a token acquisition command is issued from the host computer 16 to VOL-A1 (PVOL) 1171 of the storage 1 11, and the MPPK 114 in charge of VOL-A1 (PVOL) 1171 receives the token acquisition command. The MPPK 114 in charge of VOL-A1 (PVOL) 1171 transmits the token related to the generated copy source VOL-A to the host computer 16, and the host computer 16 acquires the token. In S062, the host computer 16 transmits a TCOPY command including the token of the issue source copy source VOL-A to VOL-B1 (PVOL) 1381 of the storage 3 13, and the MPPK 114 in charge of VOL-B1 (PVOL) 1381 receives the same.

In S063, the MPPK 114 in charge of VOL-B1 (PVOL) 1381 searches the VOL within the storage 3 13 by the VOL management table 33. As a result of the search, the MPPK 114 in charge of VOL-B1 (PVOL) 1381 can only find the VOL-B1 (PVOL) 1381, and cannot find the copy source VOL-A. In the present search processing, VOL-B2 (SVOL) 1182 constituting an HA pair configuration with VOL-B1 (PVOL) 1381 is recognized to be existing in the storage 1 11. In S064, the MPPK 114 in charge of VOL-B1 (PVOL) 1381 transfers the TCOPY command including the token of the copy source VOL-A to VOL-B2 (SVOL) 1182.

In S065, the MPPK 114 in charge of VOL-B2 (SVOL) 1182 searches the VOLs within the storage 1 11 by the VOL management table. As a result of the search, the MPPK 114 in charge of VOL-B2 (SVOL) 1182 finds VOL-A1 (PVOL) 1171 and VOL-B2 (SVOL) 1182. In S066, the MPPK 114 in charge of VOL-A1 (PVOL) 1171 reads the copy target data from VOL-A1 (PVOL) 1171, and writes the read data to the cache memory of the CMPK 115. In S067, the MPPK 114 in charge of VOL-B2 (SVOL) 1182 transfers the copy target data and the write command read from the cache memory to the MPPK 114 in charge of VOL-B1 (PVOL) 1381. In S068, the MPPK 114 in charge of VOL-B1 (PVOL) 1381 receives the copy target data and the write command. In S069, the MPPK 114 in charge of VOL-B1 (PVOL) 1381 writes the copy target data to VOL-B1 (PVOL) 1381. After writing is completed, the MPPK 114 in charge of VOL-B1 (PVOL) 1381 sends the write complete report to the MPPK 114 in charge of VOL-B2 (SVOL) 1182. In S06a, the MPPK 114 in charge of VOL-B2 (SVOL) 1182 having received the write complete report writes the copy target data to the VOL-B2 (SVOL) 1182.

In the configuration of FIG. 15, when the VOL-A2 (SVOL) receives the TCOPY command, it corresponds to the case where the PVOL and the SVOL of the virtual VOL-A are switched in (C08).

<C07: VOL-A2 and VOL-B1 are Disposed in Same Subsystem (TCOPY)>

Figure 16:
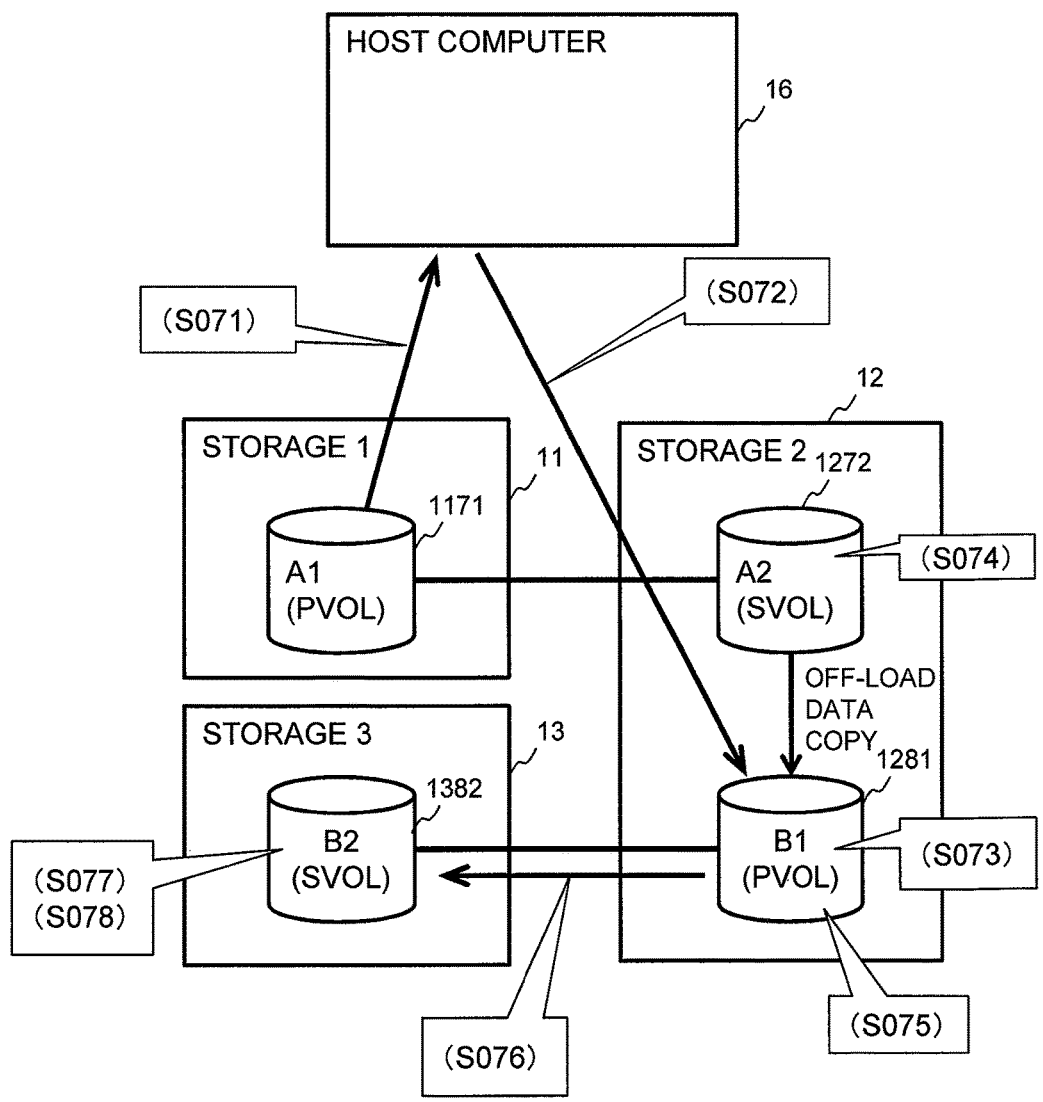
FIG. 16 is a view illustrating a seventh off-load data copy operation.

FIG. 16 is a view illustrating a seventh off-load data copy operation.

In S071, a token acquisition command is issued from the host computer 16 to VOL-A1 (PVOL) 1171 of the storage 1 11, and the MPPK 114 in charge of VOL-A1 (PVOL) 1171 receives the token acquisition command. The MPPK 114 in charge of VOL-A1 (PVOL) 1171 transmits the token related to the generated copy source VOL-A to the host computer 16, and the host computer 16 acquires that token. In S072, the host computer 16 transmits a TCOPY command including the token of the issue source copy source VOL-A to VOL-B1 (PVOL) 1281 of the storage 2 12, and the MPPK 114 in charge of VOL-B1 (PVOL) 1281 receives the same.

In S073, the MPPK 114 in charge of VOL-B1 (PVOL) 1281 searches the VOLs within the storage 2 12 by the VOL management table 42. As a result of the search, the MPPK 114 finds VOL-A2 (SVOL) 1272 and VOL-B1 (PVOL) 1281. According to this search processing, it is recognized that VOL-B1 (PVOL) 1281 and VOL-B2 (SVOL) 1382 constituting an HA pair configuration therewith exist within the storage 3 13.

In S074, the MPPK 114 in charge of VOL-A2 (SVOL) 1272 reads the copy target data from VOL-A2 (SVOL) 1272, and writes the read data to the cache memory of the CMPK 115. In S075, the MPPK 114 in charge of VOL-A2 (SVOL) 1272 transfers the copy target data read from the cache memory and the write command to the MPPK 114 in charge of VOL-B1 (PVOL) 1281. Then, the MPPK 114 in charge of VOL-B1 (PVOL) 1281 writes the copy target data to VOL-B1 (PVOL) 1281. In S076, the MPPK 114 in charge of VOL-B1 (PVOL) 1281 transfers the TCOPY command including the token of the copy source VOL-A and the copy target data to VOL-B2 (SVOL) 1382.

In S077, the MPPK 114 in charge of VOL-B2 (SVOL) 1382 receives the TCOPY command and the copy target data. In S078, the MPPK 114 in charge of VOL-B2 (SVOL) 1382 writes the copy target data to the VOL-B2 (SVOL) 1382.

In the configuration of FIG. 16, when VOL-A2 (SVOL) receives the TCOPY command, it corresponds to the case where the PVOL and the SVOL of the virtual VOL-A are switched in (C05).

<C08: VOL-A2 and VOL-B2 are Disposed in Same Subsystem (TCOPY)>

Figure 17:
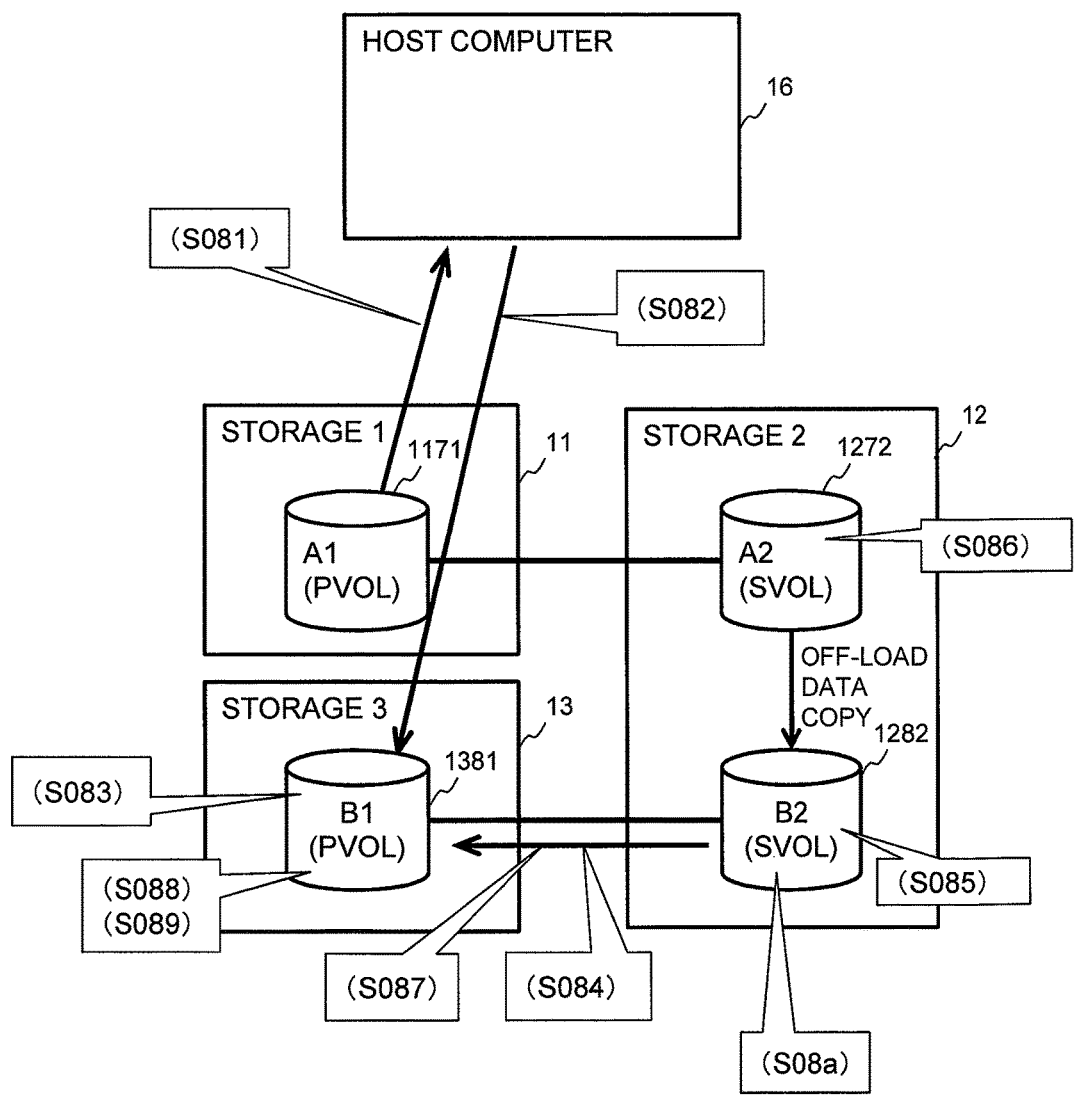
FIG. 17 is a view illustrating an eighth off-load data copy operation.

FIG. 17 is a view illustrating an eight off-load data copy operation.

In S081, a token acquisition command is issued from the host computer 16 to VOL-A1 (PVOL) 1171 of the storage 1 11, and the MPPK 114 in charge of VOL-A1 (PVOL) 1171 receives the token acquisition command. The MPPK 114 in charge of VOL-A (PVOL) transmits the token related to the generated copy source VOL-A to the host computer 16, and the host computer 16 acquires the token. In S082, the host computer 16 transmits a TCOPY command including the token issued by the copy source VOL-A to VOL-B1 (PVOL) 1381 of the storage 3 13, and the MPPK 114 in charge of VOL-B1 (PVOL) 1381 receives the same.

In S083, the MPPK 114 in charge of VOL-B1 (PVOL) 1381 searches the VOLs within the storage 3 13 by the VOL management table 43. As a result of the search, the MPPK 114 in charge of VOL-B1 (PVOL) 1381 finds VOL-B1 (PVOL) 1381 in the storage 3 13, but cannot find VOL-A. By this search processing, it is recognized that VOL-B2 (SVOL) 1282 constituting an HA pair configuration with VOL-B1 (PVOL) 1381 exists within the storage 2 12.

In S084, the MPPK 114 in charge of VOL-B1 (PVOL) 1381 transfers the TCOPY command including the token issued by the copy source VOL-A to the MPPK 114 in charge of VOL-B2 (SVOL) 1282 of the storage 2 12 constituting an HA pair configuration with VOL-B1 (PVOL) 1381. In S085, the MPPK 114 in charge of VOL-B2 (SVOL) 1282 searches the VOL within the storage 2 12 by the VOL management table 42. As a result of the search, the MPPK 114 finds VOL-A2 (SVOL) 1272 and VOL-B2 (SVOL) 1282.

In S086, the MPPK 114 in charge of VOL-A2 (SVOL) 1272 reads the copy target data from the VOL-A2 (SVOL) 1272, and writes the read data to the cache memory of the CMPK 115. In S087, the MPPK 114 in charge of the VOL-B2 (SVOL) 1282 transfers the read copy target data and the write command to the MPPK 114 in charge of VOL-B1 (PVOL) 1381.

In S088, the MPPK 114 in charge of VOL-B1 (PVOL) 1381 receives the copy target data and the write command. In S089, the MPPK 114 in charge of VOL-B1 (PVOL) 1381 writes the copy target data to VOL-B1 (PVOL) 1381. After the writing is completed, the MPPK 114 in charge of VOL-B1 (PVOL) 1381 sends the write complete report to the MPPK 114 in charge of VOL-B2 (SVOL) 1282. In S08a, the MPPK 114 in charge of VOL-B2 (SVOL) 1282 writes the copy target data to VOL-B2 (SVOL) 1282.

As described, by simply transmitting the token acquisition command and a TCOPY command generated from the token to the storage subsystem, the host computer 16 can have the off-load data copy among the storage subsystems (data copy from virtual VOL-A to virtual VOL-B) executed. Since the read/write processing for copying data to the storage subsystem becomes unnecessary in the host computer 16, the processing performance thereof can be enhanced. Furthermore, since the time of occupation of the network between the host computer 16 and the storage subsystems can be cut down, the response performance can also be improved. In the configuration of FIG. 17, when the VOL-A2 (SVOL) receives the TCOPY command, it corresponds to the case where the PVOL and the SVOL of the virtual VOL-A are switched in (C06).

<Main Processing (TCOPY Command)>

Figure 18:
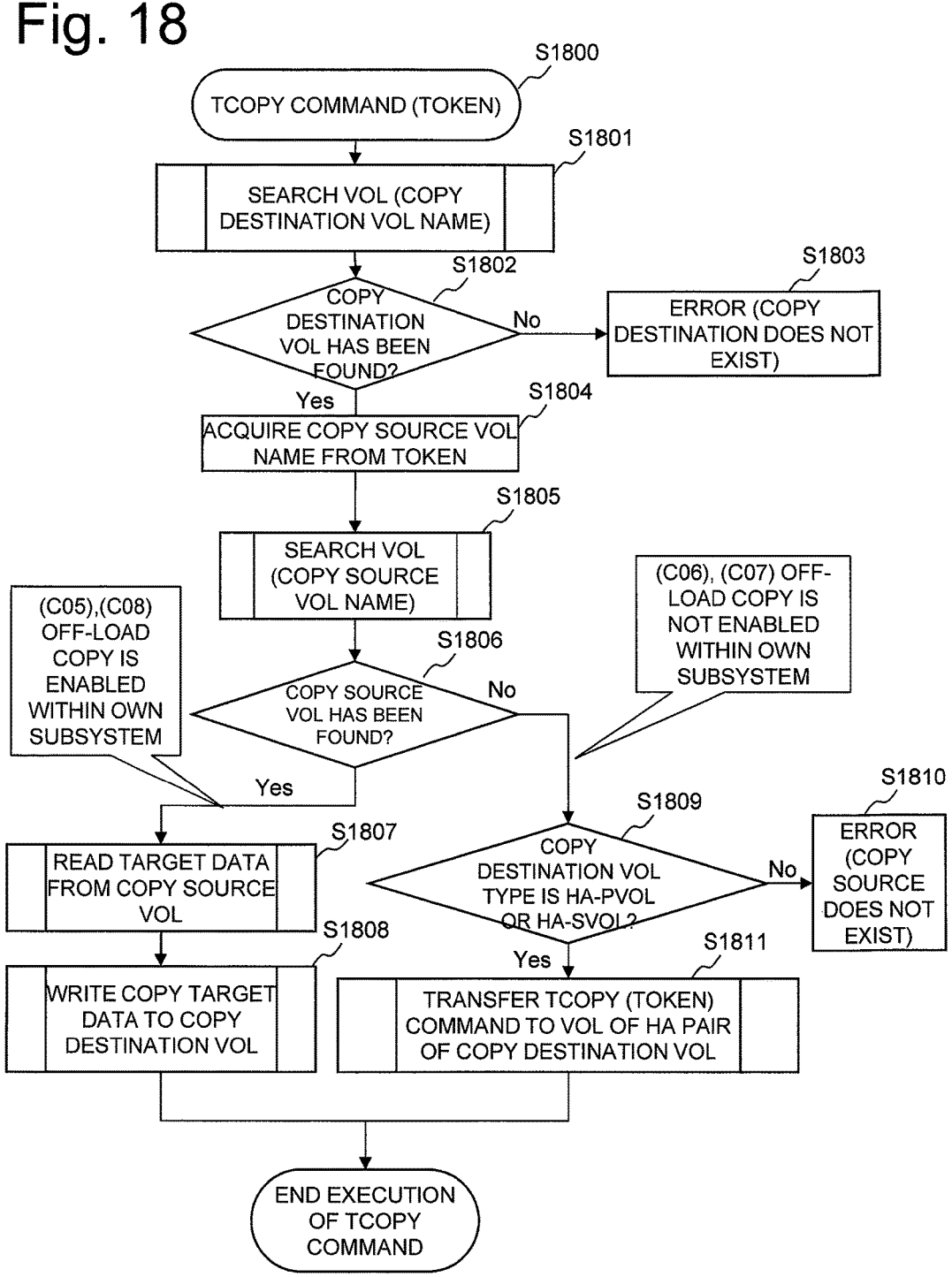
FIG. 18 is a flowchart illustrating a main processing according to the fifth through eighth off-load data copy operations.

FIG. 18 is a flowchart illustrating a main processing according to the fifth to eighth off-load data copy operations. The present processing is started when the host computer 16 issues a TCOPY command including a token acquired by the token acquisition command to the storage subsystem to the storage subsystem having the copy destination VOL. Further, in order to simplify the description, the subject of the processing is simply referred to as the MPPK 114. In S1800, the MPPK 114 receives the TCOPY command (token), and starts the off-load data copy processing.

In S1801, the MPPK 114 searches the VOL corresponding to the copy destination virtual VOL (hereinafter referred to as copy destination VOL) name of the TCOPY command by the VOL management table. That is, the MPPK 114 confirms whether the copy destination VOL name exists or not in the virtual VOL name 312 of the VOL management table. In S1802, the MPPK 114 determines whether the copy destination VOL has been found or not. If it has been found (Yes), the MPPK 114 executes S1804, and if not (No), the MPPK executes S1803. In S1803, the MPPK 114 transmits an error report stating that the copy destination VOL had not been found to the host computer 16, and ends the processing.

In S1804, the MPPK 114 acquires a copy source virtual VOL (hereinafter referred to as copy source VOL) name from the token of the TCOPY command. In S1805, the MPPK 114 searches whether the acquired copy source VOL name exists or not in the virtual VOL name 312 of the VOL management table. In S1806, the MPPK 114 determines whether the copy source VOL has been found or not. If it has been found (Yes), the MPPK 114 executes S1807. Cases (C05) and (C08) correspond to this case, where off-load data copy is enabled within a single storage subsystem (within its own subsystem). If it has not been found (No), the MPPK 114 executes S1809. Cases (C06) and (C07) correspond to this case, where off-load data copy within a single storage subsystem (within its own subsystem) is not possible.

In S1807, the MPPK 114 reads the copy target data from the copy data storage source of the copy source VOL. In S1808, the MPPK 114 writes the copy target data to the copy data storage destination of the copy destination VOL. During the read processing of S1807 and the write processing of S1808, write lock is performed so that the copy target data is not rewritten by other processes (such as the destaging process).

In S1809, the MPPK 114 determines whether the copy destination VOL type is HA-PVOL or HA-SVOL based on the VOL type 313 of the VOL management table 31/41. If HA pair configuration is adopted (Yes), the MPPK 114 executes S1811. If HA pair configuration is not adopted (No), the MPPK 114 executes S1810, and transmits an error report that a copy source VOL does not exist to the host computer 16.

In S1811, the MPPK 114 transfers a TCOPY command to the storage subsystem in which the HA pair VOL of the copy destination VOL exists. The processing performed in the storage subsystem to which the TCOPY command has been transferred will be described with reference to FIG. 19. Then, the MPPK 114 transmits a TCOPY command completion report to the host computer 16, and ends the processing.

<Processing of Transferred TCOPY Command>

Figure 19:
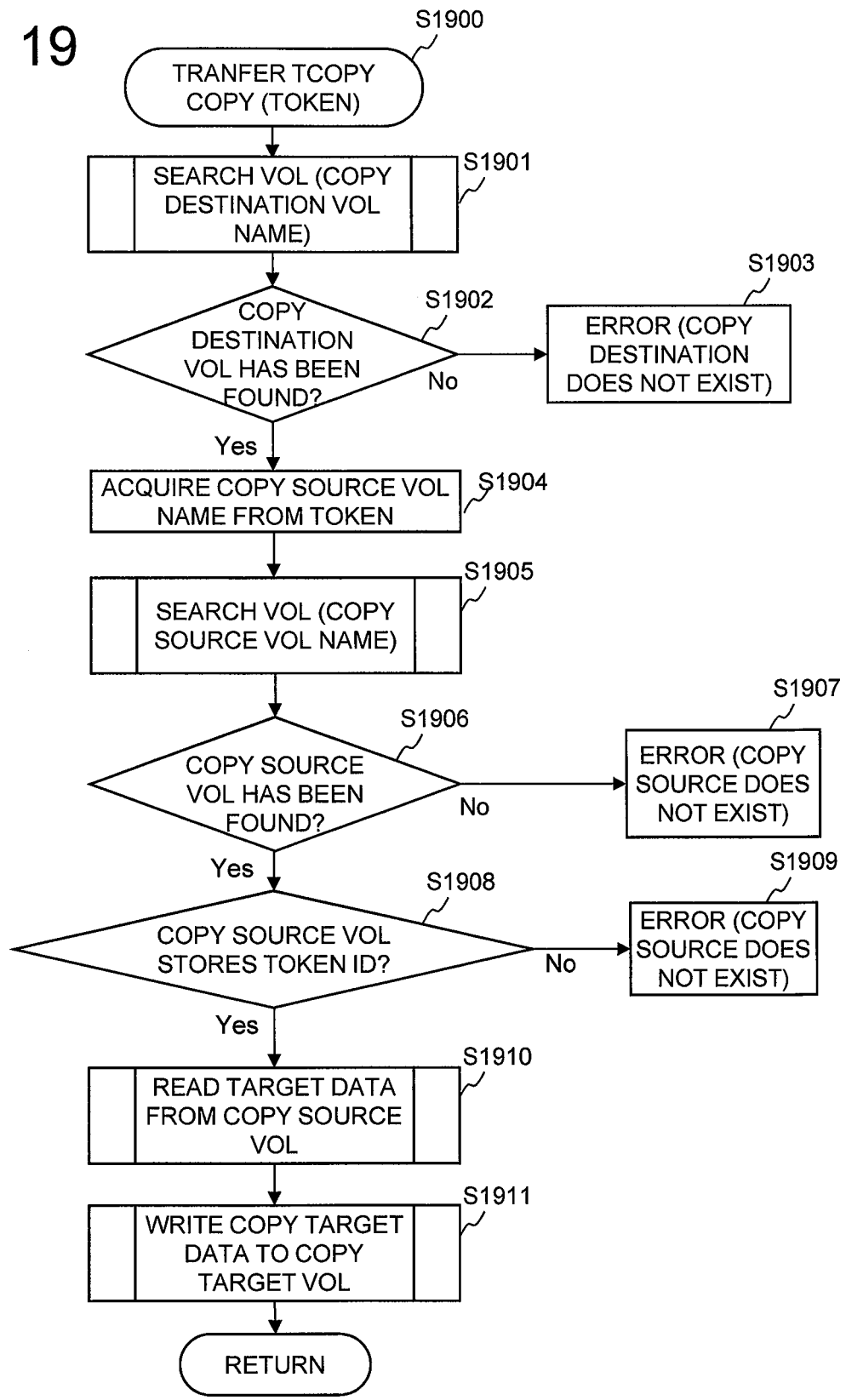
FIG. 19 is a flowchart illustrating an off-load data copy operation performed on the side of a volume having received the transferred off-load data copy command (TCOPY command).

FIG. 19 is a flowchart illustrating an off-load data copy processing performed at the volume side having received the transferred off-load data copy command (TCOPY). The present processing is started when the transferred SCOPY command has been received in (C06) and (C07).

In S1900, the MPPK 114 receives a TCOPY command transferred from other storage subsystems. In S1901, the MPPK 114 searches the virtual VOL name 312 of the VOL management table to find the copy destination VOL name in the TCOPY command. In S1902, the MPPK 114 determines whether the copy destination VOL has been found. If the copy destination VOL has been found (Yes), the MPPK 114 executes S1004. If it has not been found (No), the MPPK 114 executes S1003, and sends an error report that the copy destination VOL does not exist to the host computer 16. It is also possible to execute the processes of S1901 and S1902 to all the storage subsystems connected to the storage subsystem having received the transferred TCOPY command, in order to find the copy destination VOL.

In S1904, the MPPK 114 acquires the copy source VOL name from the token within the TCOPY command. In S1905, the MPPK 114 searches the virtual VOL name 312 of the VOL management table to find the VOL corresponding to the acquired copy source VOL name. In S1906, the MPPK 114 determines whether the copy source VOL has been found. If the copy source VOL has been found (Yes), the MPPK 114 executes S1908. If it has not been found (No), the MPPK 114 executes S1907, and transmits an error report stating that the copy source VOL does not exist to the host computer 16. It is also possible to execute the processes of S1905 and S1906 to all the storage subsystems connected to the storage subsystem having received the transferred TCOPY command, so as to find the copy source VOL.

In S1908, the MPPK 114 determines whether the copy source VOL has stored the token ID. In HA pair configuration, the token ID is retained by both the PVOL and the SVOL for duplication. By the copy source VOL storing this token ID, the MPPK 114 can recognize the copy source VOL (whether the VOL is a single copy source VOL (PVOL) or whether the copy source VOL (PVOL) and the copy source VOL (PVOL) constitute a pair configuration) from which the copy target data should be read based on the TCOPY command, and can read the copy target data from either one of the copy source VOLs. The detailed processing will be described with reference to FIG. 20. If the copy source VOL has stored the token ID (Yes), the MPPK 114 executes S1910. If the copy source VOL has not stored the token ID (No), in S1909, the MPPK 114 transmits an error report notifying that the copy source VOL does not exist to the host computer 16.

In S1910, the MPPK 114 reads the copy target data from the copy source VOL, and writes the read copy target data to the cache memory of the CMPK 115. In S1911, the MPPK 114 reads the copy target data stored in the cache memory of the CMPK 115, and writes the read copy target data to the copy destination VOL. After completing the process of S1911, the MPPK 114 returns the process to S1811 of FIG. 18. The VOL search processing described earlier is the same as the process of FIG. 11, the read processing of S1807/S1910 is the same as the process of FIG. 12, and the write processing of S1808/S1911 is the same as the process of FIG. 13.

<Token Processing>

Figure 20:
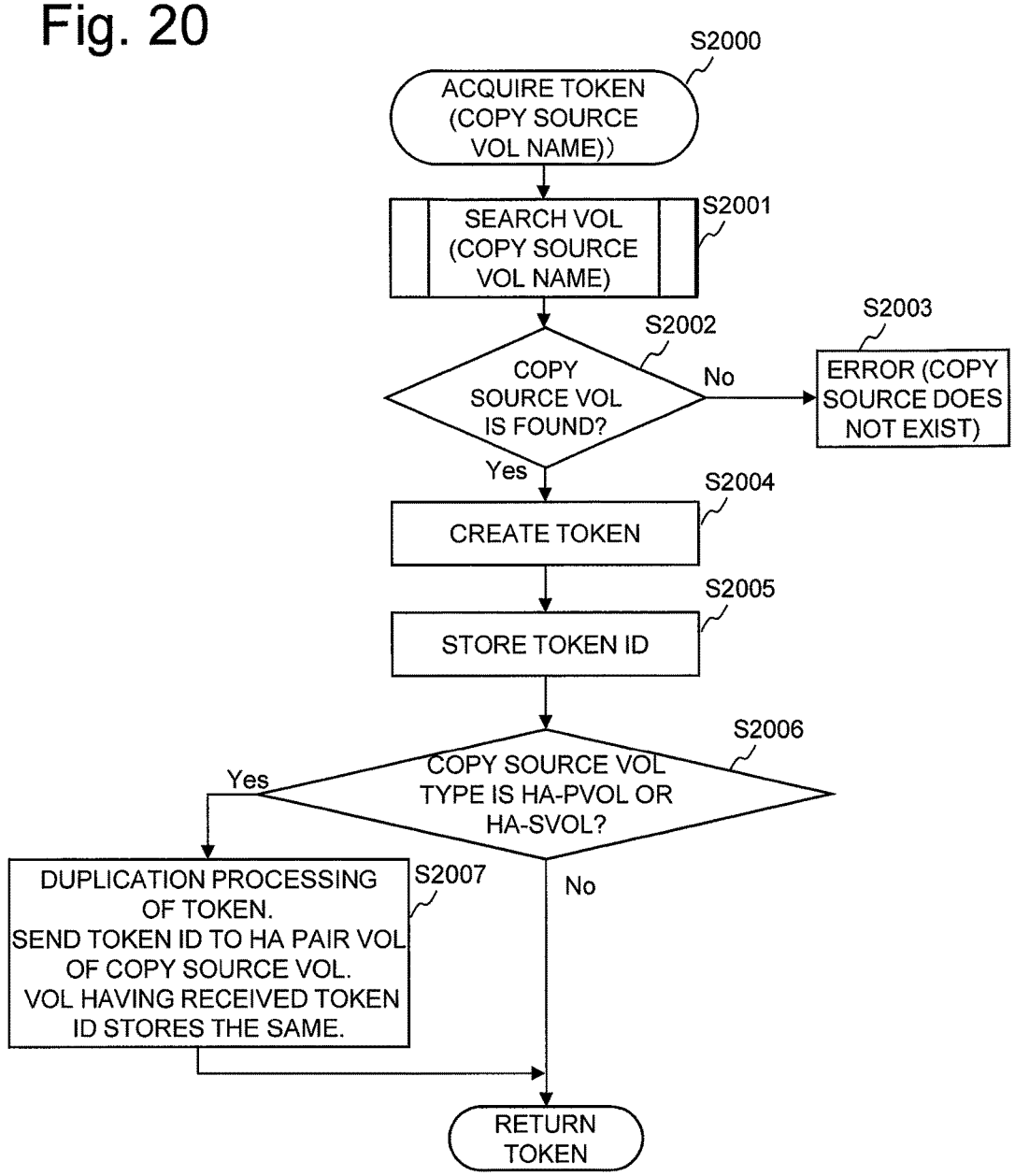
FIG. 20 is a flowchart showing a process performed with respect to a token at the side of a volume having received a token acquisition command.

FIG. 20 is a flowchart illustrating a processing performed to the token from the volume side having received the token acquisition command. In S2000, the MPPK 114 receives the token acquisition command (copy source virtual VOL name, copy data storage source) from the host computer 16. By receiving this token acquisition command, the process in the MPPK 114 is started.

In S2001, the MPPK 114 searches the virtual VOL name 312 of the VOL management table, and finds a VOL corresponding to the acquired copy source VOL name. In S2002, the MPPK 114 determines whether or not the copy source VOL has been found. If the copy source VOL has been found (Yes), the MPPK 114 executes S2004. If it has not been found (No), the MPPK 114 executes S2003, and transmits an error report that the copy source VOL does not exist to the host computer 16.

In S2004, the MPPK 114 generates a token having added a token ID for uniquely identifying a token to the received token acquisition command information (copy source virtual VOL name, copy data storage source). In S2005, the MPPK 114 stores the token ID of the copy source VOL. Further, the token can be stored in the local memory to which the MPPK 114 in charge of the copy source VOL accesses, for token identification and the like.

In S2006, the MPPK 114 determines whether the copy source VOL type is HA-PVOL or HA-SVOL based on the VOL type 313 of the VOL management table. If it is an HA pair configuration VOL (Yes), the MPPK 114 executes S2007. In S2007, the MPPK 114 executes a duplication processing of the token.

According to the token duplication processing, the MPPK 114 sends a token ID to the HA pair VOL of the copy source VOL, and the HA pair VOL having received the token ID stores the token ID in itself. If the VOL constitutes an HA pair configuration (No), the MPPK 114 transmits the generated token to the host computer 16. It is also possible to have the generated token transmitted to the host computer 16 in S2004. Thereby, the processing of the token acquisition command at the storage subsystem side and the processing of the TCOPY command generation at the host computer 16 side can be executed in parallel, so that the overall processing performance of the storage system can be improved. Further, by duplicating the token, even if the token is lost in one of the copy source VOLs, the off-load data copy can be continued in the other copy source VOL. Further, it is possible to acquire the load of the copy source VOLs having the same token, so as to read the data from the copy source VOL having a lighter load, and prevent the deterioration of access performance to the copy source VOL.

According to the processes described above, the host computer 16 can perform off-load data copy between given volumes by simply issuing a token acquisition command and a TCOPY command accompanying the same to the storage subsystem. Therefore, similar to the SCOPY command, the processing related to the copying process at the host computer 16 side can be cut down, and the processing performance of the whole host computer 16 and the storage system can be enhanced. Moreover, regarding the off-load data copy processing, the data transfer speed and the transfer efficiency can be improved by using ports dedicated for mutually connecting storage subsystems and dedicated lines, so that the copy time can be shortened.

<Off-Load Data Copy Among Different Subsystems: C11-C14>

Figure 21:
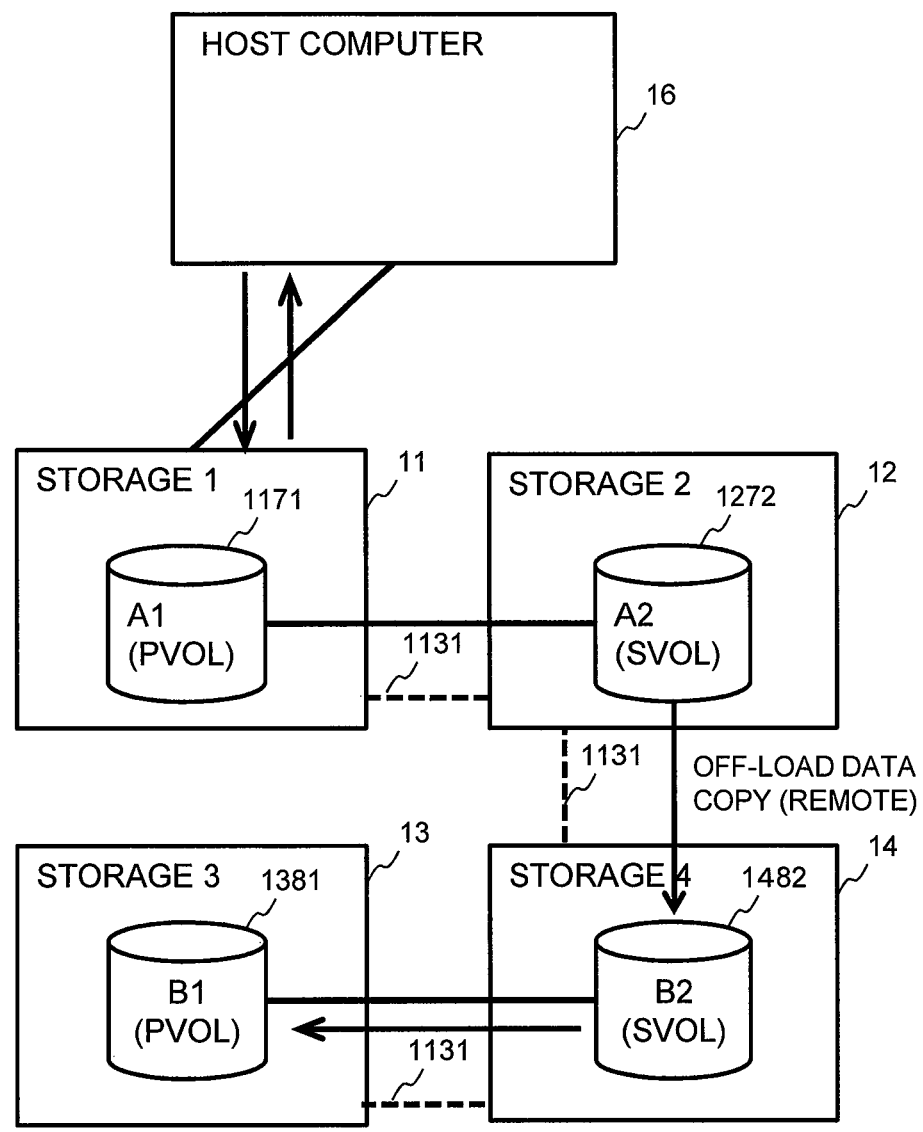
FIG. 21 is a view showing a ninth off-load data copy operation (where the copy source volume and the copy destination volume exist in different storage subsystems).

With reference to FIG. 21, the off-load data copy operation of the case where copy source VOL-A (VOL-A1 (PVOL), VOL-A2 (SVOL)) and copy destination VOL-B (VOL-B1 (PVOL), VOL-B2 (SVOL)) all exist in different storage subsystems will be described.

At first, VOL-A1 (PVOL) 1171 exists in the storage 1 11, VOL-A2 (SVOL) 1272 exists in the storage 2 12, VOL-B1 (PVOL) 1381 exists in the storage 3 13, and VOL-B2 (SVOL) 1482 exists in the storage 4 14. It is assumed that the respective storages are in an environment where they are capable of communicating mutually via the PORT 113.

For example, when an SCOPY command is issued from the host computer 16 to VOL-A1 (PVOL) 1171 of the storage 1 11, the MPPK 114 in charge of VOL-A1 (PVOL) 1171 starts the off-load data copy process. At first, the MPPK 114 searches the volumes within its own subsystem by the VOL management table 31. Then, the MPPK 114 in charge of VOL-A1 (PVOL) 1171 confirms the existence of only VOL-A1 (PVOL) 117 in the storage 1 11. At the same time, the MPPK 114 recognizes based on the information of the HA pair VOL storage destination 314 in the VOL management table 31 that VOL-A2 (SVOL) 1272 exists in the storage 2 12.

Next, the MPPK 114 in charge of VOL-A1 (PVOL) 1171 searches the VOL management table 31 of the storage 4 14 via the storage 2 12. As a result of the search, it recognizes that VOL-B2 (SVOL) 1482 exists in the storage 4 14. At the same time, the MPPK 114 in charge of VOL-A1 (PVOL) 1171 recognizes based on the information of the HA pair VOL storage destination 314 in the VOL management table 31 that VOL-B1 (PVOL) 1381 exists in the storage 3 13. As described, by searching the VOL management table of different storage subsystems, the storage subsystem having received the off-load data copy command can specify the storage subsystem in which the copy source VOL or the copy destination VOL exists. A cascade configuration is illustrated as an example in FIG. 21, but the VOL search can also be performed via a multi-target configuration.

Since the storage has been specified in which the VOL exists, data is copied from the copy source VOL-A to the copy destination VOL-B via remote copy. Thus, searching of VOLs in different subsystems and remote copy among different subsystems can be performed by communication (port 113 and dedicated line 1131) between different storage subsystems. That is, VOLs that are disposed in storage subsystems capable of communicating with one another can be handled as if the VOLs are disposed within the same storage subsystem, and provided to the host computer 16. Thereby, the same processing as the off-load data copy processing within the VOL disposed within the same storage subsystem described in the present embodiment can also be performed in a VOL disposed in different storages capable of communicating mutually.

In the above-described description, the HA pair configuration has been described as being composed of two VOLs (VOL-B1 (PVOL) and VOL-B2 (SVOL)), but the invention is not restricted thereto. The number of VOLs can be three or more. Further, as for the connection configuration, it is possible to adopt a cascade configuration where the VOL-B2 (SVOL1) connects to the VOL-B1 (PVOL), and the VOL-B3 (SVOL2) connects to the VOL-B2 (SVOL1). Even further, the off-load data copy according to the present embodiment can be executed in a multi-target configuration where the VOL-B2 (SVOL1) and the VOL-B3 (SVOL2) are connected to the VOL-B1 (PVOL).

As described, the storage system of the preferred embodiment of the present invention adopts an HA pair configuration capable of continuing the operation of the system even when a whole storage subsystem experiences system down, according to which a highly reliable system is realized, while an off-load data copy realizing high performance and efficient use of resources is enabled by cutting down the data processing time and reducing the load of the host computer.

The present invention is not restricted to the above-illustrated preferred embodiments, and can include various modifications. The above-illustrated embodiments are described in detail to help understand the present invention, and the present invention is not restricted to a structure including all the components illustrated above. Further, a portion of the configuration of an embodiment can be replaced with the configuration of another embodiment, or the configuration of a certain embodiment can be added to the configuration of another embodiment. Moreover, a portion of the configuration of each embodiment can be added to, deleted from or replaced with other configurations. The respective configurations and functions described above can be realized via software by the processor interpreting and executing programs realizing the respective functions.

The information such as the programs, tables and files for realizing the respective functions can be stored in a storage device such as a memory, a hard disk or an SSD (Solid State Drive), or in a memory medium such as an IC card, an SD card or a DVD. Only the control lines and information lines considered necessary for description are illustrated in the drawings, and not necessarily all the control lines and information lines required for production are illustrated. In actual application, it can be considered that almost all the components are mutually coupled.

REFERENCE SIGNS LIST 11, 12, 13, 14, 15: Storage subsystem
16: Host computer
17: Management computer
31, 32, 33, 41, 42, 43: VOL management table
114: MPPK
115: CMPK
1141: Processor core
1142: Local memory

The invention claimed is:

1. A storage system connected to a host computer, the storage system comprising:
a first storage subsystem and a second storage subsystem,
wherein the storage system is configured to duplicate data in a first volume of the first storage subsystem to a second volume of the second storage subsystem and constitute a High Availability (HA) pair with the first volume and the second volume, and assign a same first virtual ID to the first volume and the second volume, so that the first storage subsystem or the second storage subsystem is capable of responding to an access request from the host computer using the first virtual ID, and
when one of the first storage subsystem or the second storage subsystem receives an instruction of an off-load data copy specifying the first virtual ID as a copy source and a second virtual ID as a copy destination from the host computer, the one of the first storage subsystem or the second storage subsystem that receives the instruction of the off-load data copy is further configured to:
select one of the first volume or the second volume, as a copy source volume, corresponding to one of the first storage subsystem or the second storage subsystem in which a third volume, as a copy destination volume, assigned the second virtual ID exists, and
copy the data from the selected copy source volume to the copy destination volume.

2. The storage system according to claim 1, wherein the storage system is further configured to:
duplicate data in the third volume to a fourth volume, assigned the same second virtual ID and that constitutes another HA pair with the third volume, and
the other HA pair is capable of responding to an access request from the host computer using the same second virtual ID.

3. The storage system according to claim 2, wherein the storage system is further configured to:
after the data read from the copy source volume is written to the third volume, duplicate the data in the third volume to the fourth volume.

4. The storage system according to claim 2, further comprising:
a third storage subsystem, wherein the third volume is disposed in the first storage system, and the fourth volume is disposed in the third storage subsystem.

5. The storage system according to claim 2, wherein the fourth volume is disposed in the first storage subsystem, and the third volume is disposed in the second storage subsystem.

6. The storage system according to claim 2, further comprising:
a third storage subsystem, wherein the fourth volume is disposed in the third storage subsystem, and the third volume is disposed in the second storage subsystem.

7. The storage system according to claim 2, wherein the fourth volume is disposed in the second storage subsystem, and the third volume is disposed in the first storage subsystem.

8. The storage system according to claim 1, wherein each of the first storage subsystem and the second storage subsystem respectively includes a controller programmed to control the respective volumes, wherein the controller is programmed to receive the instruction of the off-load data copy from the host computer, and execute data copying from the specified first virtual ID to the specified second virtual ID.

9. The storage system according to claim 8, wherein the host computer issues a token acquisition command to the first storage subsystem or the second storage subsystem,
the first storage subsystem or the second storage subsystem having received the token acquisition command is further configured to:
generate a token that is information indicating the copy source volume and a copy data storage source in the volume added with a token ID for uniquely identifying the token, return the generated token to the host computer, and
store the token ID in the first volume and the second volume, and
the host computer generates the instruction from the received token, and by transmitting the instruction to the controller of the first storage subsystem or the second storage subsystem, the controller executes the data copying from the copy source volume to the copy destination volume.

10. The storage system according to claim 1, wherein, when one of the first storage subsystem or the second storage subsystem receives the instruction of the off-load data copy, the storage system is further configured to:
determine whether or not the copy destination volume and the copy source volume exist within the same one of the first storage subsystem or the second storage subsystem which received the instruction of the off-load data copy, and
when the copy destination volume and the copy source volume do not exist within the same one of the first storage subsystem or the second storage subsystem which received the instruction of the off-load data copy, transfer the instruction of the off-load data copy to the other one of the first storage subsystem or the second storage subsystem which is a location where both of the copy source volume and the copy destination volume exist without inquiring to the host.

11. The storage system according to claim 10, wherein the first storage subsystem and the second storage subsystem each store a management table of correspondence between locations of the first volume, the second volume, and the copy destination volume, and the storage system is further configured to:
refer to the management table to determine whether or not the copy destination volume and the copy source volume exist within the same one of the first storage subsystem or the second storage subsystem.

12. A storage subsystem connected to a host computer, comprising:
one or more processors; and
one or more storage devices which configure a first volume,
wherein the one or more processors are programmed to:
duplicate data in the first volume to an external second volume and constitute a High Availability (HA) pair with the first volume and the second volume, and assign a same first virtual ID to the first volume and the second volume, so as to be capable of responding to an access request from the host computer using the first virtual ID, and
wherein, when an instruction of an off-load data copy specifying the first virtual ID as a copy source and a second virtual ID as a copy destination is received from the host computer, the one or more processors are programmed to:
select the first volume, as a copy source volume, when a third volume, as a copy destination volume, assigned the second virtual ID exists in the storage subsystem, and
copy data from the selected copy source volume to the copy destination volume.

13. The storage system according to claim 12, wherein, when the instruction of the off-load data copy specifying the first virtual ID as the copy source and the second virtual ID as the copy destination is received from the host computer, the one or more processors are programmed to:
duplicate data in the third volume to an external fourth volume, assigned the same second virtual ID and that constitutes another HA pair with the third volume, and
the other HA pair is capable of responding to an access request from the host computer using the same second virtual ID.

14. A data migration method of a storage system connected to a host computer, wherein
the storage system comprises a first storage subsystem and a second storage subsystem,
the storage system is configured to duplicate data in a first volume of the first storage subsystem to a second volume of the second storage subsystem and constitute a High Availability (HA) pair with the first volume and the second volume, and assign a same first virtual ID to the first volume and the second volume, so that the first storage subsystem or the second storage subsystem is capable of responding to an access request from the host computer using the virtual ID,
the method comprising:
a step of receiving an instruction of an off-load data copy specifying the first virtual ID as a copy source and a second virtual ID as a copy destination from the host computer by the first storage subsystem or the second storage subsystem;
a step of selecting one of the first volume or the second volume, as a copy source volume, corresponding to one of the first storage subsystem or the second storage subsystem in which a third volume, as a copy destination volume, assigned the second virtual ID exists; and
a step of copying the data from the selected copy source volume to the copy destination volume.

* * * * *